(12) United States Patent
Suzuki

(10) Patent No.: US 7,333,715 B2
(45) Date of Patent: Feb. 19, 2008

(54) DATA REPRODUCTION TRANSMISSION APPARATUS AND DATA REPRODUCTION TRANSMISSION METHOD

(75) Inventor: Kazuhiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 442 days.

(21) Appl. No.: 11/011,448

(22) Filed: Dec. 14, 2004

(65) Prior Publication Data

US 2005/0100318 A1 May 12, 2005

Related U.S. Application Data

(63) Continuation of application No. 09/613,895, filed on Jul. 11, 2000, now Pat. No. 6,980,732.

(30) Foreign Application Priority Data

Jul. 12, 1999 (JP) ................................. 11-198140

(51) Int. Cl.
*H04N 5/91* (2006.01)
(52) U.S. Cl. ........................... 386/68; 386/111; 386/112
(58) Field of Classification Search .................. 386/46, 386/68, 70, 111, 112, 125
See application file for complete search history.

(56) References Cited

U.S. PATENT DOCUMENTS 5,841,938 A * 11/1998 Nitta et al. .................... 386/68

| | | | |
|---|---|---|---|
| 6,073,721 A | 6/2000 | Grabowski |
| 6,211,800 B1 | 4/2001 | Yanagihara et al. |
| 6,330,365 B1 | 12/2001 | Yasuda et al. |
| 6,445,738 B1 | 9/2002 | Zdepski et al. |
| 6,504,996 B1 | 1/2003 | Na et al. |
| 6,542,693 B2 | 4/2003 | Boyce |
| 6,724,981 B1 | 4/2004 | Park et al. |

* cited by examiner

*Primary Examiner*—Huy Nguyen
(74) *Attorney, Agent, or Firm*—Frommer Lawrence & Haug LLP; William S. Frommer; Paul A. Levy

(57) ABSTRACT

In the case that the video and audio information obtained from the digital broadcast or a digital recording medium coded according to a predetermined information processing rule is digitally transmitted, the normal reproduction and special reproduction are performed reproducibly as in the case of an analog signal processing equipment. A data reproduction transmission apparatus for reproducing the video and audio information coded according to a predetermined information processing rule provided with a decoding means 2 for decoding the coded data that includes the video and audio information, a data conversion means 3 for converting the digital data obtained from the decoding means 2 to the video and audio information that is acceptable for an analog signal processing equipment, and a data restructuring means 4 for restructuring coded data or decoded digital data that includes at lease the video and audio information to the coded data that is acceptable for a digital signal processing equipment.

7 Claims, 21 Drawing Sheets

\* : BIT STREAM OF P OR B PICTURE OF DIFFERENCE "0"

✱ :BIT STREAM OF P OR B PICTURE OF DIFFERENCE "0"
8' :BIT STREAM GENERATED BY ENCODIG B PICTURE WITH I PICTURE
9' :BIT STREAM GENERATED BY ENCODIG P PICTURE WITH I PICTURE

DATA REPRODUCTION TRANSMISSION APPARATUS AND DATA REPRODUCTION TRANSMISSION METHOD

This is a continuation of application Ser. No. 09/613,895, filed Jul. 11, 2000, now U.S. Pat. No. 6,980,732.

BACKGROUND OF THE INVENTION

1. Field of the Invention

This invention relates to a data reproduction transmission apparatus and a data reproduction transmission method that are suitably applied to a video audio information reproduction transmission apparatus for reproducing the video and audio information coded according to a predetermined information processing rule and for transmitting it to a digital signal processing equipment.

This invention more particularly relates to a data reproduction transmission apparatus and a data reproduction transmission method that are capable of normal reproduction and special reproduction of the image such as static reproduction, fast forward reproduction, or fast backward reproduction with good reproducibility as in the case of the analog signal processing equipment, in the case that the video and audio information that is obtained from the digital broadcast or a digital memory medium is digitally transmitted wherein the video and audio information is coded according to a predetermined information processing rule so that the coded data or decoded data including the video and audio information is restructured to the coded data that is acceptable for a digital signal processing equipment.

2. Description of the Related Art

Recently, digital signal processing equipments have been popularly used more than analogue signal processing equipments as the semiconductor integration circuit technology has been developed. For example, in many cases the video audio information is recorded in the digital recording medium such as optical disc. In the field of the television broadcast, the digital broadcast, which codes the video audio information and supplies it to the receiver side, is becoming popular. A dynamic image compression technique such as MPEG (Moving Picture Experts Group: International Standardization Organization, standard system for compressing dynamic image) has been employed to efficiently record or efficiently transmit the video audio information that is handled in these information processing fields. In MPEG-TS system, the video audio information is coded according to a predetermined information processing rule.

FIG. 1 is a conceptual diagram for illustrating an exemplary structure of a digital video audio processing system. In the digital video audio processing system shown in FIG. 1, in many cases, a video recording reproduction apparatus 5 connected to an analog television 6 is used, and the digital satellite broadcast is received by an analog television 6 or digital television 7.

In the video recording reproduction apparatus 5, the video and audio information coded according to MPEG-TS transmission system is reproduced. For example, a digital recording medium 5A such as an optical disc is set on the video recording reproduction apparatus 5 and the video audio information recorded in the recording medium 5A is reproduced, or the video audio information transmitted and received from a broadcasting station by way of digital satellite is recorded. The video recording reproduction apparatus 5 of this type is connected to the analog television 6, and used to monitor the video audio information reproduced from the recording medium 5A or to monitor the video audio information transmitted from a broadcasting station. Of course, the analog video audio signal is supplied to the analog television 6 from the video recording reproduction apparatus 5.

In the case of the above-mentioned digital video audio processing system, the situation in which the video audio information reproduced from a digital recording medium 5A or the video audio information transmitted from a digital broadcasting station is transmitted to a digital television 7 by way of a digital interface (IEEE 1394) is realized as the digital broadcast system and digital television 7 have been developed. In this case, it is required that the video and audio information is transmitted by means of digital transmission as in the case of analog transmission not only for normal reproduction but also for special reproduction such as static reproduction, fast forward reproduction, or fast backward reproduction.

However, in the case of compression algorithm for performing interframe processing such as MPEG system, it is difficult for the digital signal processing equipment to realize special reproduction such as static reproduction, fast forward reproduction, or fast backward reproduction in comparison with the analog signal processing equipment. To send out the coded data to the digital television 7 when special reproduction is operated by use of the video recording reproduction apparatus 5, it is required that correct MPEG video stream is restructured and it is then supplied to the IEEE 1394 communication cable 9.

In view of the above, the present invention has been accomplished to solve the above-mentioned problem, and it is the object of the present invention to propose a data reproduction transmission apparatus and a data reproduction transmission method that are capable of normal reproduction and special reproduction of the image such as static reproduction, fast forward reproduction, or fast backward reproduction with good reproducibility as in the case of the analog signal processing equipment in the case that the video and audio information that is obtained from the digital broadcast or digital memory medium is digitally transmitted.

SUMMARY OF THE INVENTION

To solve the above-mentioned problem, a data reproduction transmission apparatus is provided, wherein the data reproduction transmission apparatus for reproducing the video and audio information coded according to a predetermined information processing rule is characterized in that a data restructuring means for restructuring the coded data or decoded data that includes at least the video and audio information to the coded data that is acceptable for a digital signal processing equipment is provided.

According to the data reproduction transmission apparatus of the present invention, the coded data or decoded data that includes the video and audio information coded according to the predetermined information processing rule is subjected to data restructuring by means of the data restructuring means according to, for example, the predetermined information processing rule that is needed for the digital signal processing equipment, and the data-restructured coded data is supplied to the digital signal processing equipment.

Therefore, even in the case that the video and audio information obtained from the digital broadcast or a digital recording medium is digitally transmitted, not only the normal reproduction but also the special reproduction such as static reproduction, fast forward reproduction, or fast backward reproduction can be performed reproducibly as in the case of an analog signal processing apparatus. The continuous image processing is performed by means of a digital signal processing equipment as in the case of an analog signal processing equipment. Thereby, the data reproduction transmission apparatus is used as a video audio information reproduction transmission apparatus.

A data reproduction transmission method in accordance with the present invention is a data reproduction transmission method for restructuring the video and audio information coded according to a predetermined information processing rule, wherein the data reproduction transmission method is characterized in that the coded data that includes the video and audio information is restructured to the coded data that is acceptable for a digital signal processing equipment.

According to the data reproduction transmission method in accordance with the present invention, even in the case that the video and audio information obtained from the digital broadcast or a digital recording medium is digitally transmitted, because the data is restructured to the coded data that is acceptable for a digital signal processing equipment, not only the normal reproduction but also the special reproduction such as static reproduction, fast forward reproduction, and fast backward reproduction is performed reproducibly as in the case of an analog signal processing equipment.

DETAILED DESCRIPTION OF THE PREFERRED EMBODIMENTS

Subsequently, preferred embodiments of a data reproduction transmission apparatus and a data reproduction transmission method in accordance with the present invention will be described in detail hereinafter with reference to the drawings.

(1) Data Reproduction Transmission Apparatus Presented as an Embodiment

Figure 1:
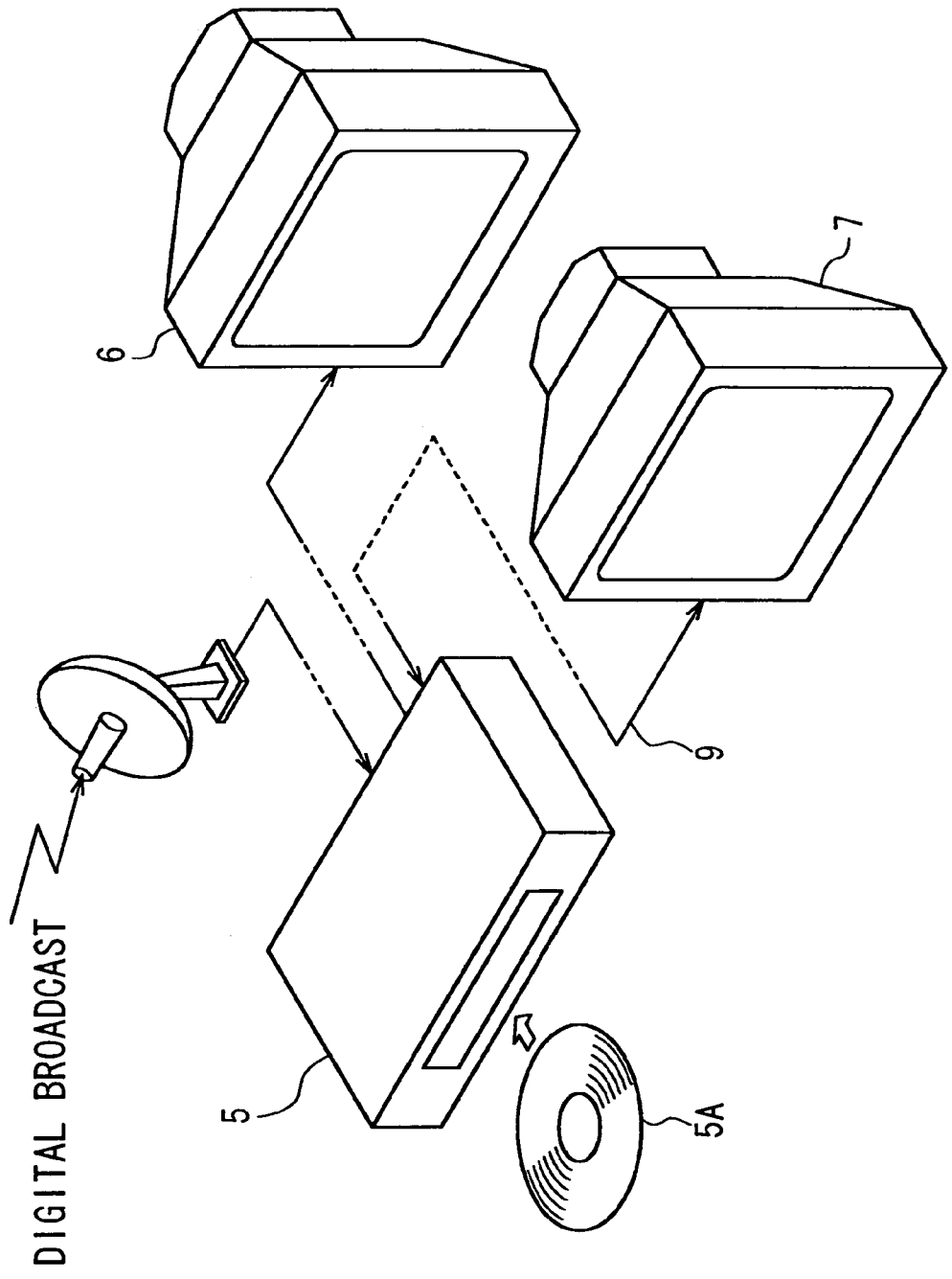
FIG. 1 is a conceptual diagram for illustrating an exemplary structure of a digital video audio processing system in accordance with the conventional system.
Figure 2:
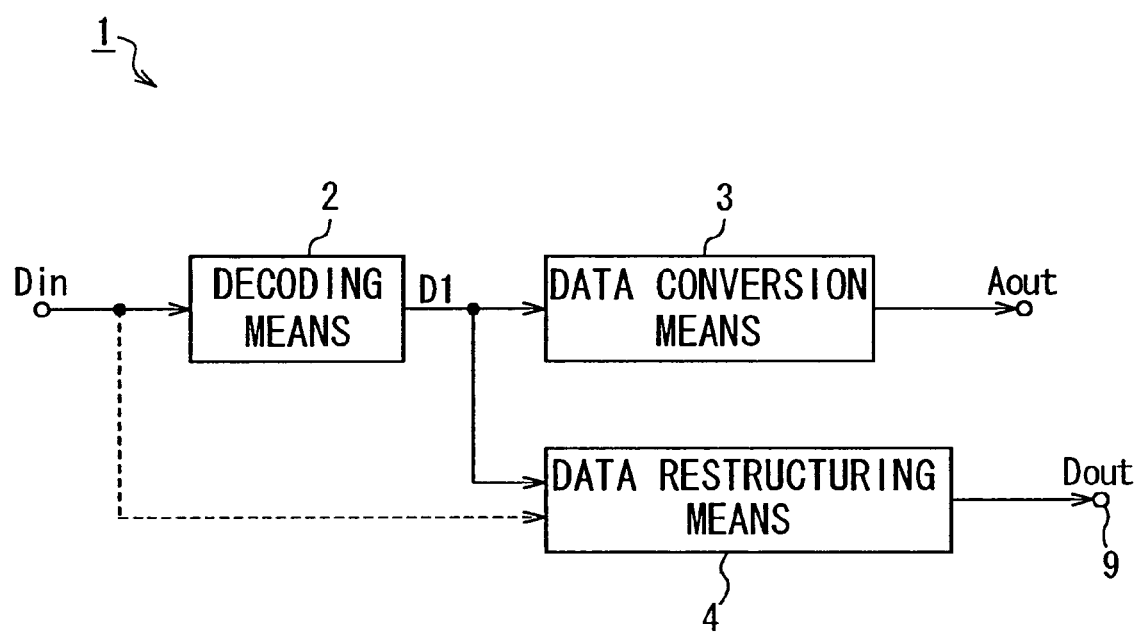
FIG. 2 is a block diagram for illustrating an exemplary structure of a data reproduction transmission apparatus 1 that is presented as an embodiment in accordance with the present invention.

FIG. 2 is a block diagram for illustrating an exemplary structure of a data reproduction transmission apparatus 1 shown as an embodiment in accordance with the present invention.

The present embodiment presents a data reproduction transmission apparatus that is capable of normal reproduction and special reproduction of the image such as static reproduction, fast forward reproduction, or fast backward reproduction with good reproducibility as in the case of the analog signal processing equipment, in the case that the video and audio information that is obtained from the digital broadcast or digital memory medium is digitally transmitted wherein the video and audio information is coded according to a predetermined information processing rule so that the coded data or decoded data including the video and audio information is restructured to the coded data that is acceptable for a digital signal processing equipment.

The data reproduction transmission apparatus 1 is an apparatus for reproducing and transmitting the video and audio information coded according to a predetermined information processing rule, for example, MPEG (Moving Picture Experts Group: International Standardization Group, standard system for compressing dynamic image)-TS transmission system established based on EC6 1883. The data reproduction transmission apparatus 1 is provided with a decoding means 2, and by which the coded data Din including video and audio information is decoded. A data conversion means 3 and a data restructuring means 4 are connected to the decoding means 2. The data conversion means 3 converts the digital data D1 sent out from the decoding means 2 to the video and audio information that is acceptable for an analog signal processing equipment. The converted analog video and audio signal Sout is supplied to an analog television 6 or the like.

The data restructuring means 4 restructures the coded data Din or decoded digital data D1 including at least video and audio information to the coded data Dout that is acceptable for a digital signal processing equipment. In this example, the data restructuring means 4 restructures the data according to a predetermined information processing rule that is needed for a digital signal processing equipment. The restructured coded data is transferred by use of IEEE 1394 communication cable 9. Furthermore, the data restructuring means 4 supplies the data-restructured coded data Dout to a digital signal processing equipment only when an image is reproduced in the special mode of static reproduction, fast forward reproduction, or fast backward reproduction.

Figure 3:
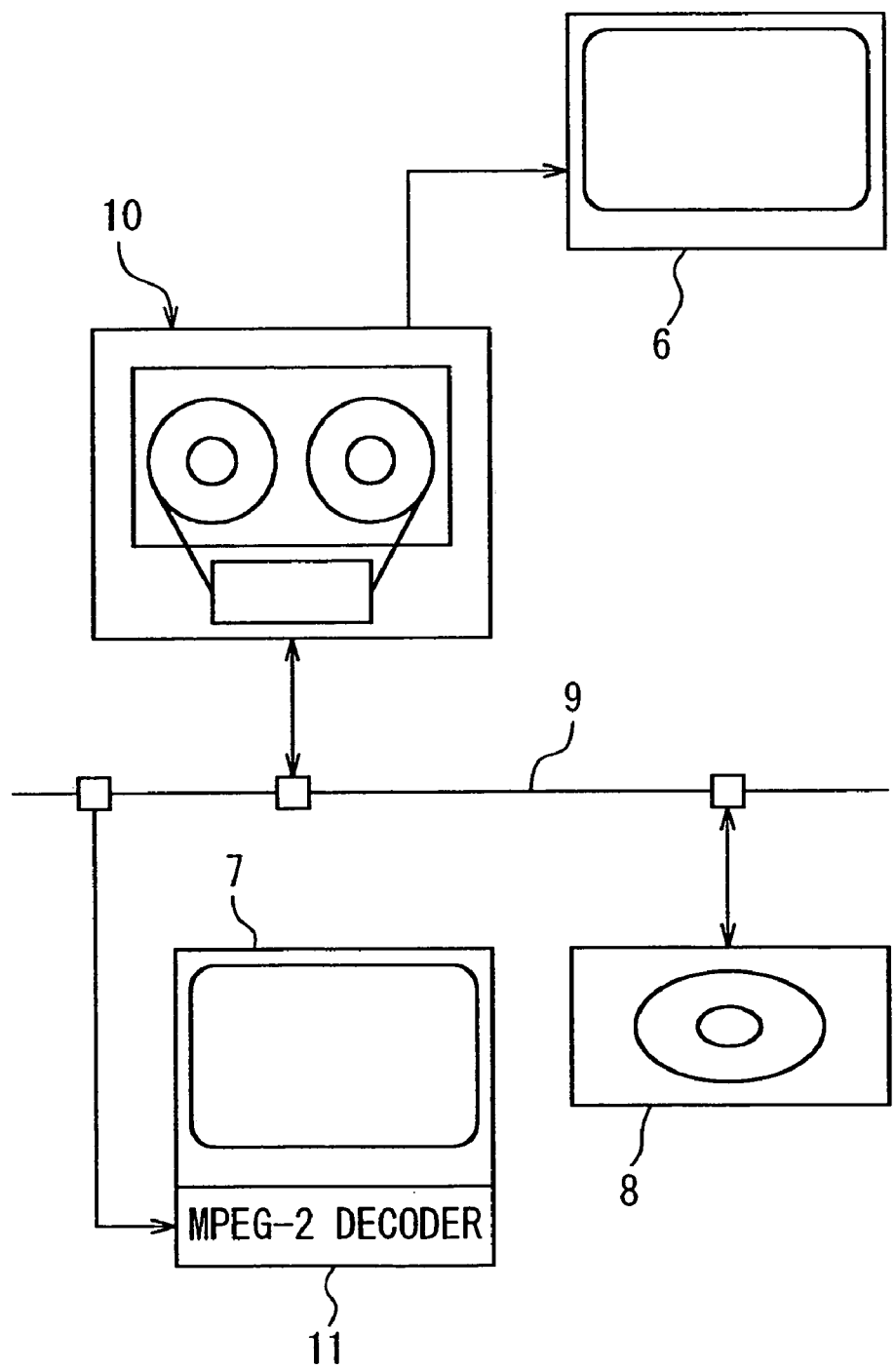
FIG. 3 is a system diagram for illustrating an example for distributing the video and audio information to an analog television 6 and a digital television 7 or the like according to a special reproduction transmission apparatus 10 to which the data reproduction transmission apparatus 1 is applied.

Subsequently, the exemplary operation for data reproduction transmission method of the data reproduction transmission apparatus 1 in accordance with the present embodiment will be described. FIG. 3 is a system diagram for illustrating exemplary distribution of the video and audio information generated from a special reproduction transmission apparatus 10 to which the data reproduction transmission apparatus 1 is applied to an analog television 6 and a digital television 7. Of course, the present invention is by no means limited to the digital/analog distribution example of the video and audio information. The present invention may be applied to any technical field in realization of which the special reproduction in the digital signal processing equipment that handles the video and audio information by means of MPEG system is required as in the case of the analog transmission.

In this example, the special reproduction transmission apparatus (digital VTR) 10 to which the data reproduction transmission apparatus 1 for reproducing the video and audio information coded according to a predetermined information processing rule is applied is provided, and the special reproduction transmission apparatus 10 is connected to the analog television 6 through an usual audio/video communication cable and connected to a digital television 7 and a digital video disc player 8 through an IEEE 1394 communication cable 9 that meets with MPEG-TS transmission system. Furthermore in this example, the video and audio information reproduced by the special reproduction transmission apparatus 10 is distributed to the analog television 6 and the digital television 7 or the like. The digital television 7 is provided with an MPEG-2 decoder 11 or the like.

Based on the above-mentioned assumption, for example, to decode the coded data Din including the high vision video and audio information in accordance with digital broadcast, the coded data Din including the video and audio information coded according to MPEG-TS transmission system is supplied to the decoding means 2. The decoding means 2 decodes the coded data Din including the video and audio information. The decoded digital data D1 is supplied to the data conversion means 3 and also to the data restructuring means 4.

The data conversion means 3 converts the decoded digital data D1 to the video and audio information that is acceptable for the analog television 6. The converted analog video and audio signal Sout is supplied to the analog television 6 though the audio/video communication cable. The high vision video and audio information in accordance with the digital broadcast can be viewed and heard on the analog television 6.

The data restructuring means 4 restructures the decoded digital data D1 including the video and audio information according to the information processing rule in accordance with MPEG-TS transmission system that is needed for, for example, the digital television 7 and supplies the restructured coded data Dout to the digital television 7. The digital television 7 decodes the coded data Dout including the video and audio information by means of the MPEG-2 decoder 11. The high vision video and audio information in accordance with the digital broadcast is viewed and heard based on the decoded digital data.

Accordingly, the video and audio information is distributed reproducibly to the analog television 6 through the data conversion means 3 and to the digital television 7 and the digital video disc player 8 through the data restructuring means 4. In the case that the video and audio information obtained from the digital broadcast or digital memory medium is digitally transmitted, the information can be reproduced not only in normal reproduction mode but also in special reproduction mode such as static reproduction, fast forward reproduction, or fast backward reproduction reproducibly as in the case of the analog signal processing equipment. Thereby, the digital signal processing equipment can perform continuous image processing as in the case of the analog signal processing equipment.

In some examples described hereinafter, the special reproduction transmission apparatus 10 restructures the data according to a predetermined information processing rule required for the digital television 7 or the digital video disc player 8 and supplies the data-restructured coded data Din to these digital signal processing equipment without decoding of the coded data Din including the video and audio information. Seven special reproduction transmission apparatus 100 to 700 to which the data reproduction transmission apparatus 1 is applied will be described mainly on the structure.

(2) FIRST EXAMPLE

Figure 4:
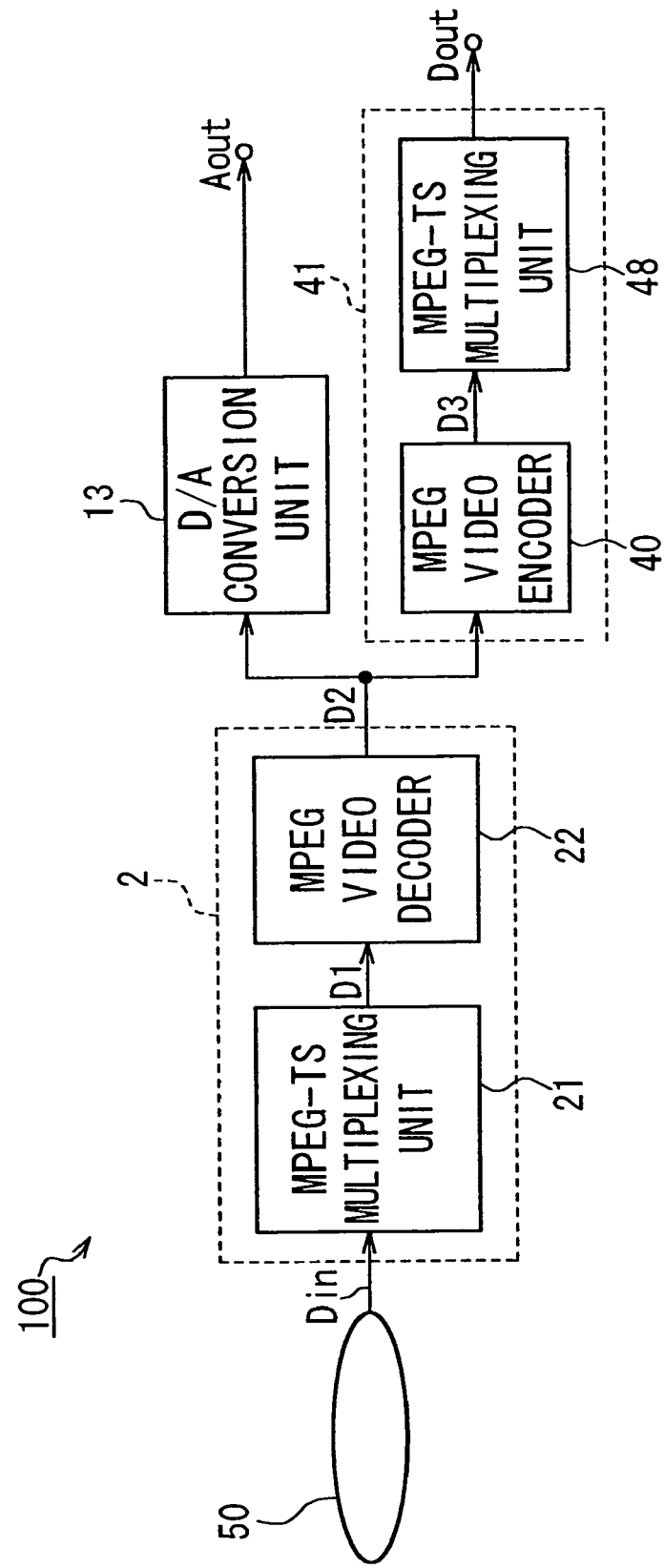
FIG. 4 is a block diagram for illustrating an exemplary structure of a special reproduction transmission apparatus 100 that is presented as the first example.

FIG. 4 is a block diagram for illustrating an exemplary structure of a special reproduction transmission apparatus 100 presented as the first example. In the present example, the information is subjected to re-coding and re-multiplexing in both cases of normal reproduction and special reproduction. Thereby, the coded data that is needed for the digital signal processing equipment is transmitted reproducibly. In the present example, a high performance encoder is provided so that deterioration of the image quality due to re-encoding is prevented.

The special reproduction transmission apparatus 100 shown in FIG. 4 reproduces the video and audio information obtained from digital broadcast or a digital memory medium (referred to as video audio information medium hereinafter) 50, and distributes the reproduced video and audio information to the analog television 6 or the digital television 7 or the like. The special reproduction transmission apparatus 100 has a decoding means 2, a digital/analog conversion unit (referred to as D/A conversion unit hereinafter) 13, and a data restructuring means 41.

The decoding means 2 has an MPEG-TS multiplexing unit (multiplexing means) 21 and an MPEG video decoder 22. The multiplexing unit 21 multiplexes the coded video and audio information obtained from the video audio information medium 50. In the case of digital broadcast, the coded video and audio information is multiplex-transmitted. In the case that the coded video information and the coded audio information are multiplexed, the information is multiplexed. In the case of the digital broadcast, because the coded video and audio information is multiplexed to a plurality of channels in many cases, in that case the coded video and audio information is multiplexed from the plurality of channels.

The coded data D1 in accordance with the multiplexed video and audio information is supplied to the MPEG video decoder 22. In the present example, only the video information is described, and description of the audio information will be omitted because MPEG audio technique is employed. The video decoder 22 has a variable length code decoding unit (Variable Length Decoding: VLD) 23, a de-quantization unit (Quantization: $Q^{-1}$) 24, an inverse discrete cosine transformation unit (Inverse Discrete Cosine Transform: IDCT) 25, and a motion compensation unit (Motion Compensation: MC) 26.

Upon receiving the coded data D1 in accordance with the multiplexed video-information, the variable length code decoding unit 23 decodes the variable length code to calculate the quantization coefficient and motion vector. The de-quantization unit 24 is connected to the variable length code decoding unit 23, and the quantization coefficient is subjected to multiplication by Q value and resumed to DCT coefficient. The inverse discrete cosine transformation unit (in some cases referred to as inverse DCT unit) 25 is connected the de-quantization unit 24, and the inverse DCT unit 25 calculates respective pixel values (luminance and chrominance) for every 8×8 pixels of a block. Herein, the original image comprises three pictures (screen).

The three types are I, P, and B pictures. I picture is the intra-frame coded image (Intra-Picture), and is the picture having the GOP (Group Of Picture) independence. In the case of I picture, all the screens are intra-coded, and coded in the same order as the original image. I picture (screen) is the actual pixel value itself. P and B pictures are difference value between corresponding pixel values.

P picture is the inter-frame forward direction predictive coded image (Predictive-Picture), and coded in the same order as the original screen. In some cases, P picture is intra-coded in the area of small block unit in a screen. B picture is the bi-directionally predictive coded image (Bi-directionally Predictive-Picture), I and P picture are processed and B picture is then interposed in-between. In some cases, B picture is intra-coded in the area of small block unit in a screen.

The motion compensation unit 26 is connected to the inverse DCT unit 25, the block that is compensated by means of the difference value between pixels corresponding to I picture and the motion vector is added to thereby code P picture and B picture. In some cases, the decoded digital data D2 is subjected to post processing. For example, because the image coded by means of MPEG1 has one-half field, that is, the number of horizontal scanning lines is one half that of the general television, the memory control for displaying the same field screen repeatedly is performed, or overwriting or line interpolation processing is performed in the case of non-interlace system.

In FIG. 4, the D/A conversion unit 13 is connected to the video decoder 22, and the digital data D2 supplied from the motion compensation unit 26 is subjected to digital/analog conversion. The D/A converted analog video audio signal Aout is supplied to the analog television 6 shown in FIG. 3.

The data restructuring means 41, in addition to the D/A conversion unit 13, is connected to the video decoder 22. The data restructuring means 41 has the MPEG video encoder 40 and MPEG-TS multiplexing unit 48. The above-mentioned motion compensation unit 26 is connected to the MPEG video encoder 40, which is an example of the coding means, and the decoded digital data D1 is coded according to the information processing rule in accordance with MPEG-TS transmission system that is needed for, for example, the digital television 7.

Figure 6:
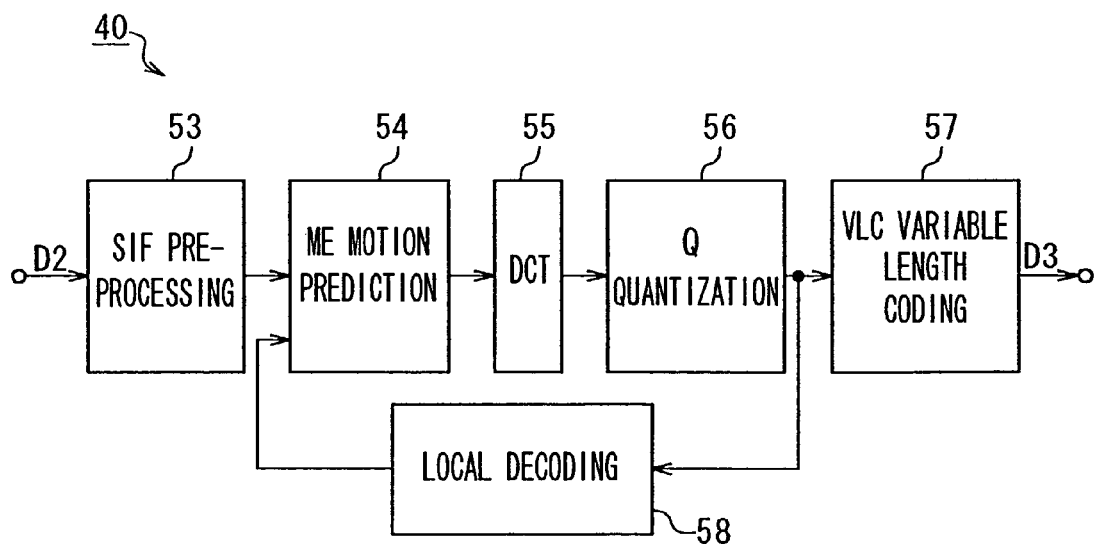
FIG. 6 is a block diagram for illustrating an exemplary structure of an MPEG video encoder 40.

The video encoder 40 has, for example, an SIF (Source Input Format) pre-processing unit 53, a motion estimation unit (Motion Estimation: ME) 54, a discrete cosine transformation unit (Discrete Cosine Transform: DCT) 55, a quantization unit (Quantization: Q) 56, a variable code coding unit (Variable Length Coding: VLC) 57, and a local decoding unit 58 as shown in FIG. 6.

In the SIF pre-processing unit 53, if the digital television 7 is of MPEG1 system, then the original image of the decoded of the decoded digital data D1 having 100 Mbps or more is subjected to field thinning and band restriction of luminance and chrominance as the pre-processing for data compression by means of this system, and it is converted to the SIF signal (352×240 pixels, 30 frames or 352×288 pixels, 25 frames) of approximately 30 Mbps. The image having the size of an integral multiple of macro block is subjected to compression based on the SIF signal.

The SIF pre-processing unit 53 is connected to the motion prediction unit 54, and the motion vector of the input image is calculated in 16×16 pixel macro block unit. The term "motion vector" means the displacement magnitude between comparison target blocks in the reference screen. The prediction method by means of the motion vector is categorized into three types, namely the forward direction prediction in which the motion of the screen is predicted based on the past screens, the inverse direction prediction in which the motion of the screen is predicted based on the future screens, and two-way prediction in which the motion of the screen is predicted based on both past screens and future screens. Three types include I picture having no prediction, P picture of forward direction prediction, and B picture of two-way prediction. In the case of B picture, it is possible to encode with a small quantity of code.

The motion prediction unit 54 is connected to the discrete cosine transformation unit (referred to as DCT unit hereinafter in some cases) 55, two-dimensional discrete cosine transformation is performed in 8×8 pixel block size unit to make difference between the motion-compensated image and the input image, and DCT transformation coefficient is generated. In the case of I picture, the input image data is subjected to DCT arithmetic directly for in-screen (frame) coding without making the difference between frames. The DCT unit 55 is connected to the quantization unit 56, the DCT transformation coefficient is quantized by use of a matrix table in consideration of visual performance. In detail, DCT transformation coefficient is divided by Q value.

The quantization unit 56 is connected to the variable length coding unit 57. The variable length coding unit 57 is provided with a memory not shown in the drawing, and the quantized value read out from the memory with zig-zag scanning is subjected to data compression according to, for example, the variable length coding system in which run length code and Huffman code are combined.

The quantization unit 56 is connected to the local decoding unit 58 in addition to the variable length coding unit 57, the local decoding unit 58 is provided with approximately the same function as that of the de-quantization unit 24 of the above-mentioned video decoder 22, the IDCT unit 25, and the motion compensation unit 26, and the motion-compensated image is generated to make the difference from the input image. The above-mentioned variable length coding unit 57 is connected to the MPEG-TS multiplexing unit 48, which is presented as an example of the multiplexing means, and the restructured coded data D3 that has been subjected to data compression is multiplexed with the coded data in accordance with the audio information. The multiplexed coded data Dout is supplied to the digital television 7.

Figure 5:
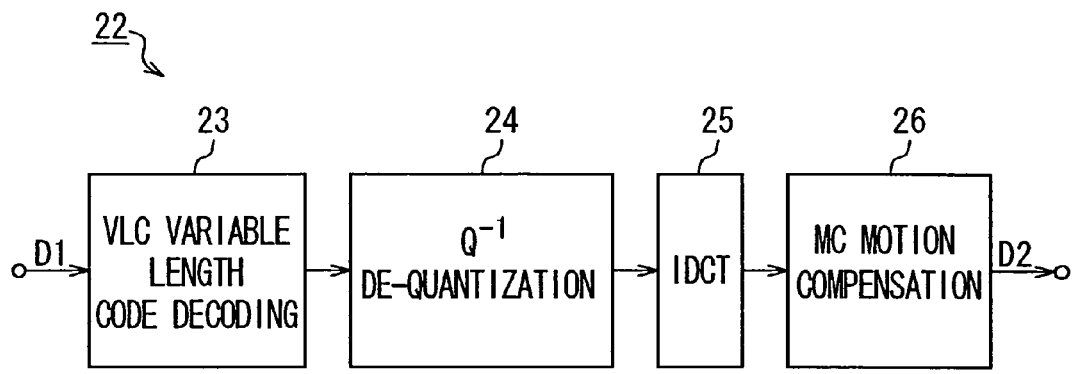
FIG. 5 is a block diagram for illustrating an exemplary structure of an MPEG video decoder 22.

Subsequently, an exemplary operation of the special reproduction transmission apparatus 100 will be described. FIG. 3 to FIG. 6 are referred again. In the present example, the special reproduction transmission apparatus 100 is connected instead of the special reproduction transmission apparatus 10 shown in FIG. 3, and the video and audio information is distributed to the analog television 6 and the digital television 7 or the like. The temporarily reproduced (decoded) video information including the special-reproduced image is compressed again by means of the MPEG encoder 40, multiplexed by means of the MPEG-TS multiplexing unit 48, and transmitted to the digital television 7 or the digital video disc player 8 through the IEEE 1394 communication cable 9.

Under the assumption described hereinabove, for example, the coded data Din including the video and audio information coded according to MPEG-TS transmission system is supplied to the multiplexing unit 21 shown in FIG. 4 to thereby multiplex the coded data Din including the high vision video and audio information in accordance with digital broadcast. The multiplexing unit 21 multiplexes the coded video and audio information from a plurality of channels of digital broadcast. The coded data D1 in accordance with the multiplexed video and audio information is supplied to the MPEG video decoder 22.

Upon receiving the coded data D1 in accordance with the multiplexed video information, the variable length code decoding unit 23 of the MPEG video decoder 22 decodes the variable length code to calculate the quantization coefficient and the motion vector. The data in accordance with the decoded quantization coefficient and the motion vector is supplied to the de-quantization unit 24. The de-quantization unit 24 subjects multiplication by Q value to the quantization coefficient, and the quantization coefficient is resumed to DCT coefficient. The DCT coefficient is supplied to the inverse IDCT unit 25. The inverse IDCT unit performs inverse DCT arithmetic to calculate respective pixel values (luminance and chrominance) for every 8×8 pixel block. The original image comprises three pictures, namely I, P, and B.

The data in accordance with these three I, P, and B pictures is supplied to the motion compensation unit 26. The motion compensation unit 26 adds the block that is compensated by means of the difference between pixels and the motion vector corresponding to I picture, and P picture or B picture is then decoded. In the case of the decoded digital data D2, for example, because the image coded by means of MPEG1 has one-half field, that is, the number of horizontal scanning lines is one half that of the general television, the memory control for displaying the same field screen repeatedly is performed, or overwriting or line interpolation processing is performed in the case of non-interlace system.

The post-processed digital data D2 is supplied to the D/A conversion unit 13 and supplied also to the data restructuring means 41. The D/A conversion unit 13 converts the decoded digital data D1 to the video and audio information that is acceptable for the analog television. The converted analog video and audio signal Sout is supplied to the analog television 6 through the audio/video communication cable.

In the data restructuring means 41, the SIF pre-processing unit 53 shown in FIG. 6 subjects the field thinning and band restriction of luminance and chrominance to the original image of the decoded digital data D1 having 100 Mbps or more, and it is converted to the SIF signal (352×240 pixels, 30 frames or 352×288 pixels, 25 frames) of approximately 30 Mbps. The image having the size of an integral multiple of macro block is subjected to compression based on the SIF signal.

The SIF-process data is supplied to the motion prediction unit 54. The motion prediction unit 54 calculates the motion vector of the input image in 16×16 pixel macro block unit based on the local decoding unit 58. Three types of I, P, and B pictures are predicted by calculating the motion vector.

The data in accordance with the I, P, and B pictures are supplied to the DCT unit 55. The DCT unit 55 performs two-dimensional discrete cosine transformation in 8×8 pixel block size to make the difference between frames of the motion-compensated image and the input image, and generates the DCT transformation coefficient. However, I picture is subjected to in-screen (frame) coding without making the difference between frames. Therefore, the input image data is subjected to DGT arithmetic directly.

The DCT arithmetic data is supplied to the quantization unit 56. The quantization unit 56 quantizes the DCT transformation coefficient by use of a matrix table in consideration of visual performance. In detail, DCT transformation coefficient is divided by Q value. The quantized data (quantized value) is supplied to the variable length coding unit 57. In the variable length coding unit 57, the quantized value read out from the memory with zig-zag scanning is subjected to data compression and coding according to, for example, the variable length coding system in which run length code and Huffman code are combined.

The compressed data subjected to data restructuring by means of the variable length coding unit 57 according to MPEG-TS transmission system that is needed for the above-mentioned digital television 7 is supplied to the MPEG-TS multiplexing unit 48. The MPEG-TS multiplexing unit 48 multiplexes the data-compressed restructured coded data D3 with the coded data in accordance with the audio information. The multiplexed coded data Dout is supplied to the digital television 7 through the IEEE 1394 communication cable 9. In the digital television 7, the MPEG-2 decoder 11 or the like decodes the coded data Dout including the-video and audio information. The high vision video and audio information in accordance with the digital broadcast can be viewed and heard based on the decoded digital data.

According to the special reproduction transmission apparatus 100 in accordance with the first example, the coded data that is subjected to data restructuring according to a predetermined information processing rule that is needed for the digital television 7 can be transmitted by way of the IEEE1394 communication cable without loosing the special reproduction function of analog. Therefore, in the case that the video and audio information obtained from the digital broadcast or digital memory medium is digitally transmitted, the information can be reproduced not only in normal reproduction mode but also in special reproduction mode such as static reproduction, fast forward reproduction, or fast backward reproduction reproducibly as in the case of the analog television 6.

The MPEG-TS stream obtained from the MPEG-TS multiplexing unit 48 is a data string that continues correctly, and meets the MPEG-TS system established based on IEC6

1883. Therefore, continuous image processing is performed in the digital television 7 as so in the analog television 6.

(3) SECOND EXAMPLE

Figure 7:
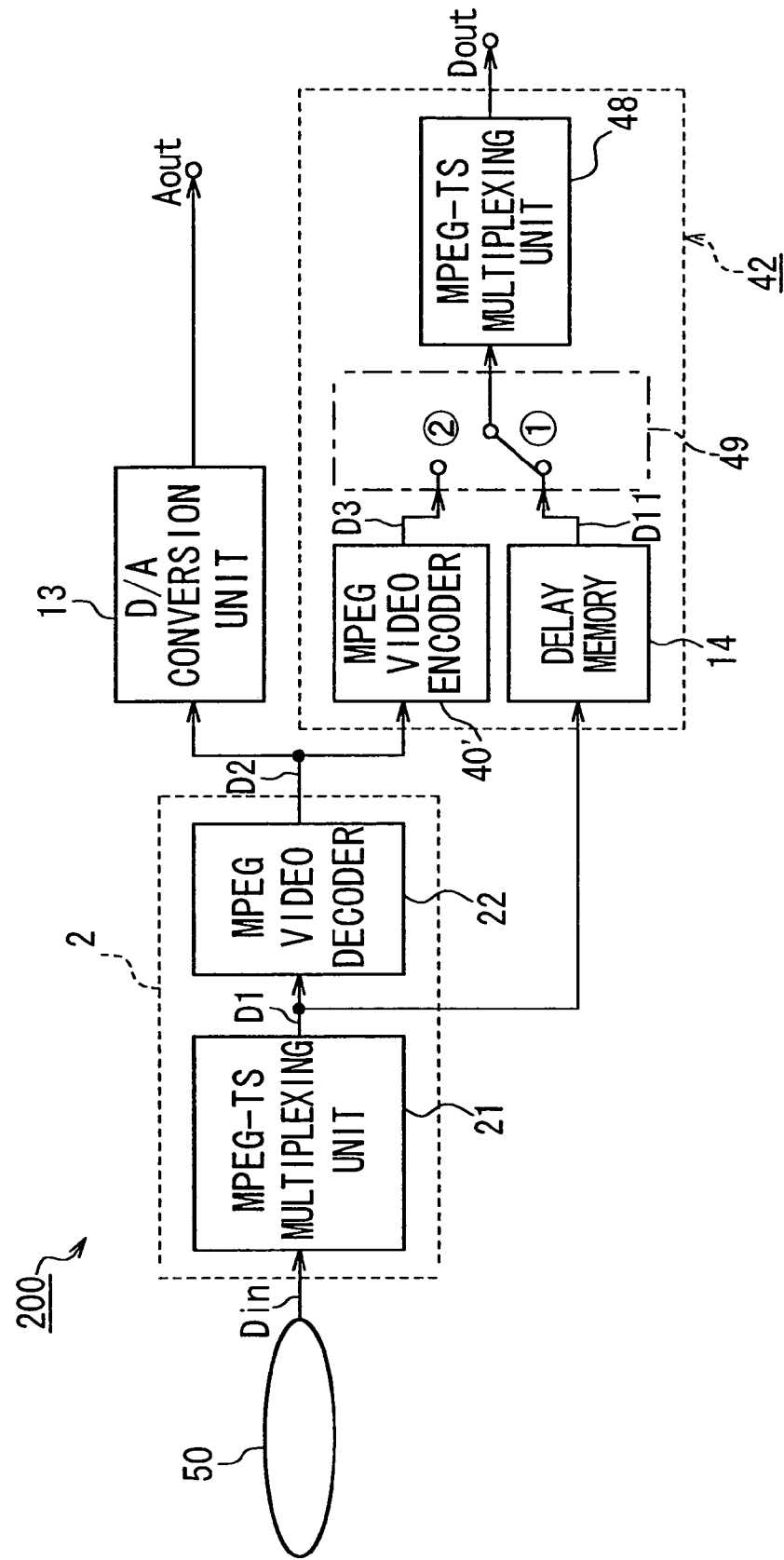
FIG. 7 is a block diagram for illustrating an exemplary structure of a special reproduction transmission apparatus 200 that is presented as the second example.

FIG. 7 is a block diagram for illustrating an exemplary structure of a special reproduction transmission apparatus 200 that is presented as the second example. In the present example, the data-restructured coded data Dout obtained by re-encoding only when the image is reproduced in the mode of static reproduction, fast forward reproduction, or fast backward reproduction is sent out to the digital television 7, and the original coded data Din is used when the image is reproduced in the mode of normal reproduction. Thereby, the cost of the data restructuring means 42 is reduced. Re-multiplexing is performed always, and the encoder is used only for special reproduction. Description of the components having the same names and the same characters as shown in the first example is omitted because the components have the same functions respectively.

The special reproduction transmission apparatus 200 shown in FIG. 7 is provided with a decoding means 2, a D/A conversion unit 13, and a data restructuring means 42. The data restructuring means 42 has an MPEG video decoder 40', a memory for delaying (referred to as delay memory hereinafter) 14, a selector 49, and an MPEG-TS multiplexing unit 48.

The MPEG video decoder 40' having the performance lower than that of the video decoder 40 described in the first example can be used. For example, the MPEG video decoder 40' having no motion detection function may be used. Generally, high image quality is not necessary for special reproduction such as fast forward reproduction or fast backward reproduction of the image, and a high quality encoder is not necessary. For example, always motion vector (0, 0) may be possible without motion detection. Though clear static image is required for pause reproduction, a high image quality is obtained with motion vector (0, 0) because the picture does not move in pause reproduction. Such an encoder is inexpensive. The high quality image is obtained because the original coded data Din is used during normal reproduction.

In the case of the MPEG video encoder 40' used in the present example, the generated bit quantity is suppressed low in comparison with the original data string, and the buffer management is performed by means of delay control in which "0" stuffing bit is interpolated at the final stage. For example, the video decoder 40' is operated to restructure the data only when the image is reproduced in the mode of special reproduction namely static reproduction, fast forward reproduction, or fast backward reproduction, on the other hand the coded data D1 multiplexed by means of the MPEG-TS multiplexing unit 21 of the decoding means 2 is allowed to pass so that re-encoding is not performed when the image is reproduced in the normal mode. The term "normal reproduction" ① means the mode in which the analog special reproduction function for static reproduction, fast forward reproduction, or fast backward reproduction, that is provided to the special reproduction transmission apparatus 100, is not activated, and on the other hand the term "special reproduction" ② means the mode in which the analog special reproduction function of the special reproduction transmission apparatus 100 is activated.

In detail, the multiplexing unit 21 is connected to the delay memory that is presented as an example of the delay means, and the multiplexed coded data D1 is delayed. The purpose of the delay is to synchronize the time for decoding of the video information to the analog signal processing equipment with the output timing of the multiplexed coded data D1. An EIFO memory or the like having RAM structure is used as the delay memory. Thereby, the bit stream such as MPEG image obtained from the video audio information medium 50 is delayed by means of the delay memory 14.

The output of the above-mentioned MPEG video decoder 40' and the output of the delay memory 14 are connected to the selector 49 that is presented as an example of the selection means, the selector 49 is controlled so as to select the output of the delay memory 14 during normal reproduction, on the other hand controlled so as to select the output of the MPEG video decoder 40' during the special reproduction. The selector 49 is operated by a user by way of the operation unit for special reproduction not shown in the drawing.

The selector 49 is connected to the MPEG-TS multiplexing unit 48 in the same manner as shown in the first example, the data-compressed restructured coded data D3 or coded data D11 delayed by means of the delay memory 14 is multiplexed with the coded data in accordance with the audio information. The multiplexed coded data Dout is supplied to the digital television 7 through the IEEE 1394 communication cable 9.

Subsequently, an exemplary operation of the special reproduction transmission apparatus 200 will be described. In the present example, the MPEG video stream recorded in the video audio information medium 50 is used as it is during normal reproduction, and the coded data Dout is transmitted to the digital television 7 by way of the multiplexing unit 21, the delay memory 14, the selector 49, and the MPEG-TS multiplexing unit 48. The re-encoded MPEG video stream is used during special reproduction, and the coded data Dout is transmitted to the digital television 7 by way of the selector 49 and the MPEG-TS multiplexing unit 48.

For example, the coded data according to MP@ML (Main Profile at Main Level) of MPEG-2 system that is used for the digital satellite broadcast and DVD (digital video disc) is supplied to the special reproduction transmission apparatus 200. The MP@ML image format involves 720 pixels×480 pixels (frame frequency is 29.97 Hz) or smaller, or 720 pixels×576 pixels (frame frequency is 25 Hz) or smaller, and the maximum rate of the coded data of 15 MHz.

① In the case that the normal reproduction is selected, because the normal reproduction ① is selected by the selector 49, the coded data D11 that is generated by delaying by means of delay memory 14 from the coded data D1 multiplexed by the MPEG-TS multiplexing unit 21 is multiplexed with the coded data in accordance with the audio information. The multiplexed coded data Dout is supplied to the digital television 7.

② In the case that the special reproduction is selected, the selector 49 is switched from the normal reproduction ① to the special reproduction ② synchronously and smoothly. Therefore, the coded data D3 re-encoded by means of the MPEG video decoder 40' is supplied to the MPEG-TS multiplexing unit 48. In the MPEG-TS multiplexing unit 48, the data-compressed restructured coded data D3 is multiplexed with the coded data in accordance with the audio information, and the multiplexed coded data Dout is supplied to the digital television 7 through the IEEE1394 communication cable 9.

As described hereinabove, in the special reproduction transmission apparatus 200 in accordance with the second example, the data-restructured coded data Dout is sent out to the digital television 7 only when the image is reproduced in the mode of special reproduction namely static reproduction, fast forward reproduction, or fast backward reproduction. Because the original coded data Din is used during normal reproduction, the high image quality is secured.

Therefore, a digital image generated by decoding the MPEG video stream is displayed on the digital television 7. An MPEG video encoder having no motion detection function may be used as the MPEG video encoder 40'. Because the encoder having no motion detection function codes always with the motion vector (0, 0), the cost of the encoder is reduced to a fraction. Thereby, the cost of the special reproduction transmission apparatus 200 is reduced.

(4) THIRD EXAMPLE

Figure 8:
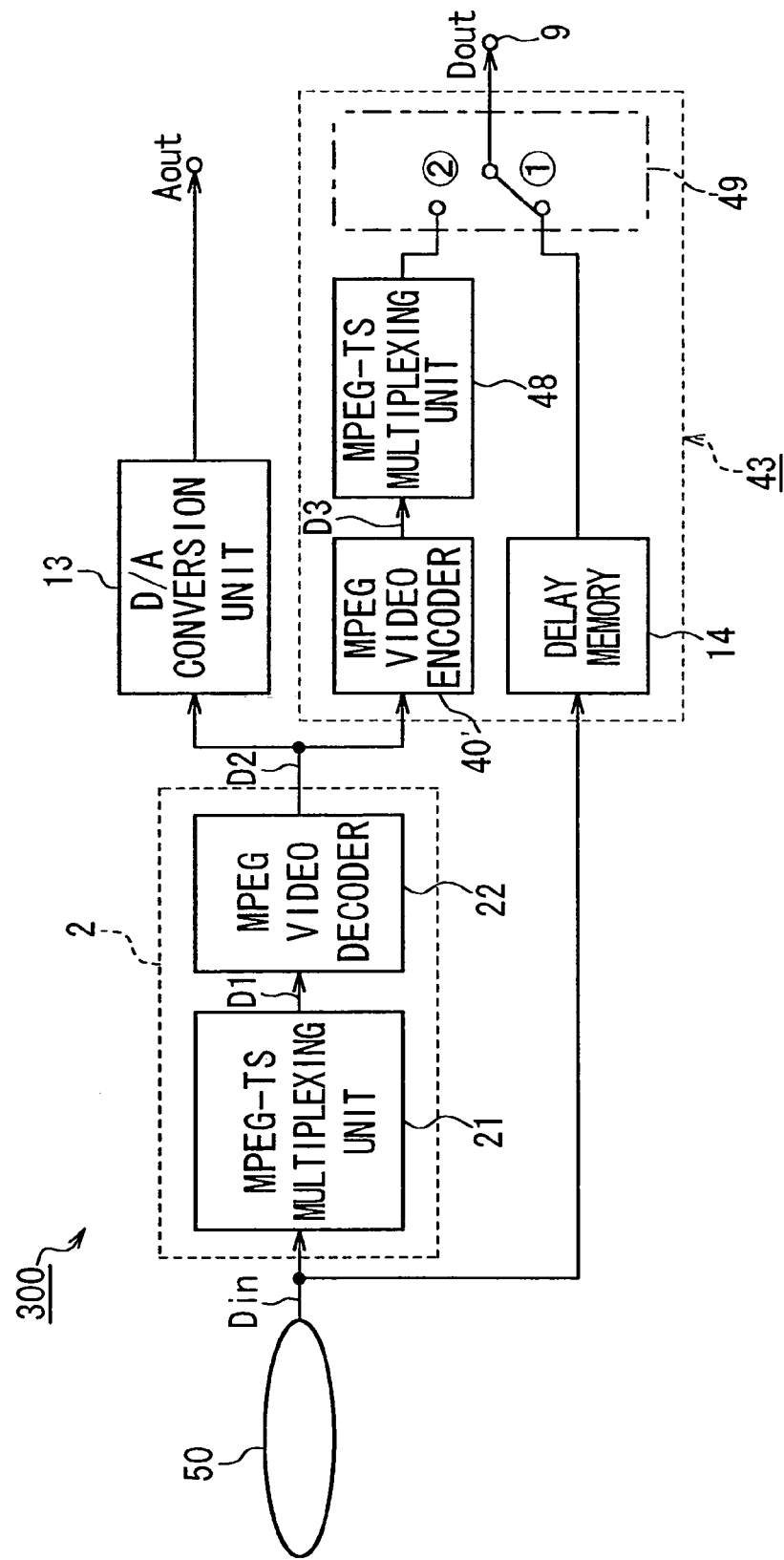
FIG. 8 is a block diagram for illustrating an exemplary structure of a special reproduction transmission apparatus 300 that is presented as the third example.

FIG. 8 is a block diagram for illustrating an exemplary structure of a special reproduction transmission apparatus 300 that is presented as the third example. Though re-multiplexing is performed always in the second example, in the third example, on the assumption that the video and audio information that is recorded in the video audio information medium 50 according to MPEG-TS, the MPEG video stream that is generated by delaying the coded data that has not been multiplexed recorded in the video audio information medium 50 is sent out as it is during normal reproduction, and on the other hand the re-encoded and multiplexed MPEG video stream is sent out during special reproduction. Description of the components having the same names and the same characters as described in the second example is omitted because the components have the same functions.

The special reproduction transmission apparatus 300 shown in FIG. 8 is provided with a decoding means 2, a D/a conversion unit 13, and a data restructuring means 43. The data restructuring means 43 has an MPEG video decoder 40', a delay memory 14, an MPEG-TS multiplexing unit 48, and a selector 49. The data restructuring means 43 of the third example is different from the data restructuring means 43 of the second example in that the position of the MPEG-TS multiplexing unit 48 and the position of the selector 49 are exchanged each other. In the third example, the input of the delay memory 14 is connected to the input stage of the multiplexing unit 21, that is the point different from the second example. The reason is that the time for decoding of the video information to the analog signal processing equipment is synchronized with the output timing of the coded data Din to the digital signal processing equipment from the video audio information medium 50.

In the present example, a video encoder having no motion detection function may be used as the video encoder 40' as in the case of the second example on the same reason as for the second example. The coded data Din that has not been multiplexed is allowed to pass so that re-encoding is not performed during normal reproduction. In the present example, the output of the MPEG video encoder 40' is connected to the MPEG-TS multiplexing unit 48, in this case the data-compressed restructured coded data D3 is multiplexed with the coded data in accordance with the audio information in advance, that is the point different from the second example. The multiplexed coded data Dout is supplied to the selector 49.

The output of the above-mentioned MPEG-TS multiplexing unit 48 and the output of the delay memory 14 are connected to the selector 49 that is presented as an example of the selection means. The selector 49 is controlled so as to select the output of the delay memory 14 during normal reproduction ①, and on the other hand the selector 49 is controlled so as to select the output of the MPEG-TS multiplexing unit 48 during special reproduction. The selector 49 is operated by a user by way of the operation unit for special reproduction not shown in the drawing as in the case of the second example. The output of the selector 49 is connected to the digital television 7 through the IEEE1394 communication cable 9.

Subsequently, an exemplary operation of the special reproduction transmission apparatus 300 will be described. In the present example, the MPEG video stream recorded in the video audio information medium 50 is used as it is during normal reproduction, and the coded data Din is transmitted to the digital television 7 by way of the delay memory 14 and the selector 49. During special reproduction, the re-encoded MPEG video stream is used, and the coded data Dout is transmitted to the digital television 7 by way of the MPEG-TS multiplexing unit 48 and the selector 49.

① In the case that the normal reproduction is selected, because normal reproduction ① is selected, the MPEG video stream that has not been multiplexed and recorded in the video audio information medium 50 is transmitted to the digital television 7 as it is through the IEEE1394 communication cable 9.

② In the case that the special reproduction is selected, the selector 49 is switched from the normal reproduction ① to the special reproduction ②. Therefore, the coded data D3 that has been re-encoded by means of the MPEG video encoder 40' is supplied to the MPEG-TS multiplexing unit 48. In the MPEG-TS multiplexing unit 48, the data-compressed restructured coded data D3-is multiplexed with the coded data in accordance with the audio information, and the multiplexed coded data Dout is transmitted to the digital television 7 by way of the selector 49 and the IEEE1394 communication cable 9.

As described hereinabove, in the case of the special reproduction transmission apparatus 300 in accordance with the third example, though the joint between the normal reproduction image and the special reproduction image is somewhat discontinuous in comparison with the second example, the data-restructured coded data Dout is transmitted to the digital television 7 only when the image is reproduced in the mode of special reproduction namely static reproduction, fast forward reproduction, or fast backward reproduction as in the case of the second example.

Therefore, in the third example, multiplexing and re-multiplexing processing can be omitted during the normal reproduction differently from the second example. Furthermore, because an MPEG video encoder having no motion detection function may be used as the MPEG video encoder 40' as in the case of the second example, the cost of the special reproduction transmission apparatus 300 is reduced.

(5) FOURTH EXAMPLE

Figure 9:
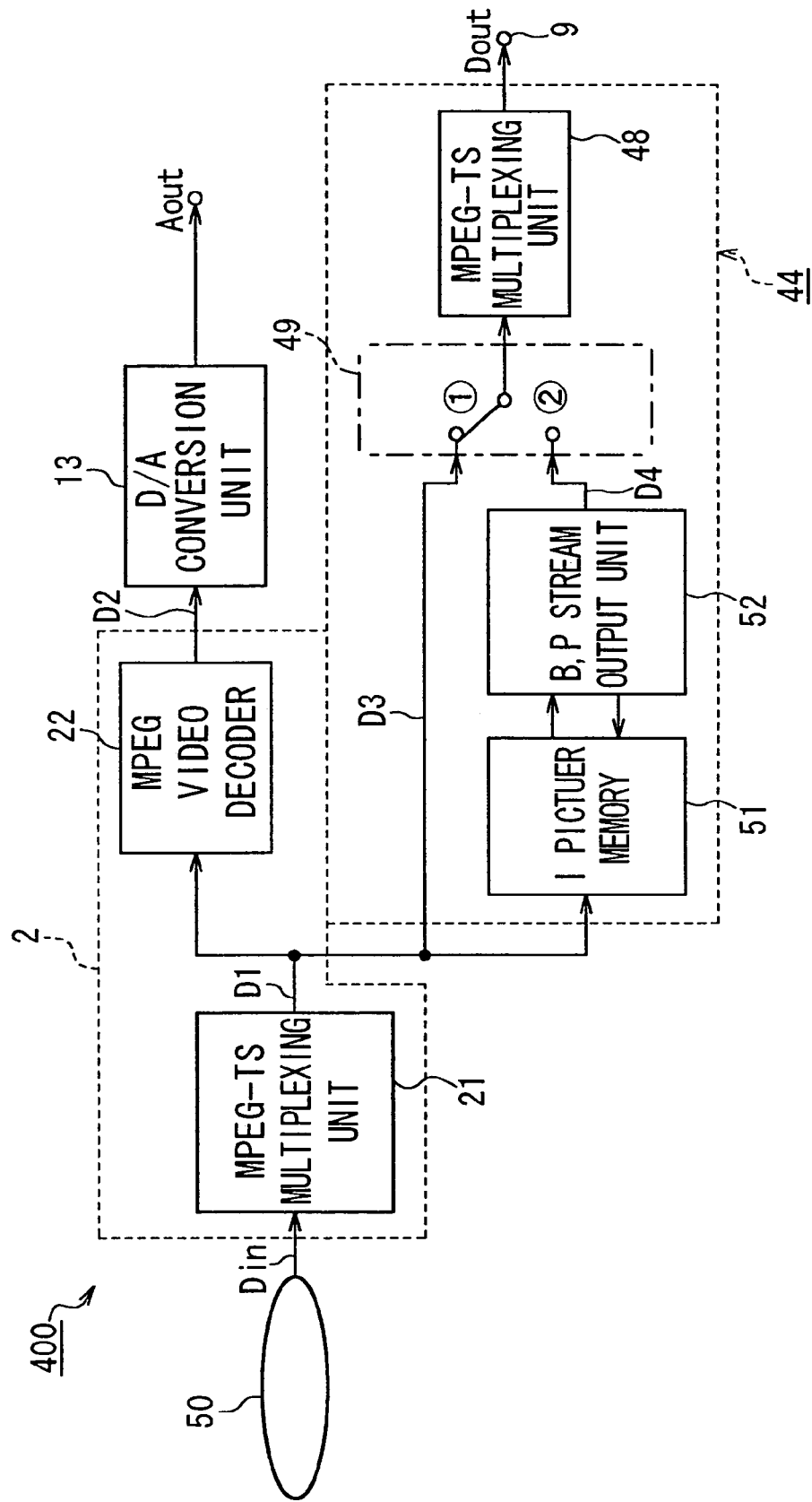
FIG. 9 is a block diagram for illustrating an exemplary structure of a special reproduction transmission apparatus 400 that is presented as the fourth example.

FIG. 9 is a block diagram for illustrating an exemplary structure of a special reproduction transmission apparatus 400 that is presented as the fourth example.

In the fourth example, the intra-picture bit stream recorded originally in the video audio information medium 50 is read out and used during the special reproduction without re-encoding differently from the first to third examples, and otherwise the bit stream of B and P pictures of fixed pattern having the motion vector (0, 0) of difference value "0" is interpolated to generate the static image of correct data string, and it is transmitted to the digital signal processing equipment.

In the present example, though this method is disadvantageous in that the image is displayed in the static reproduction mode or fast forward reproduction mode only for I picture, on the other hand this method is advantageous in that the encoder is not needed. The description of the components having the same names and the same characters as described in the first to third examples is omitted because these components have the same functions.

The special reproduction transmission apparatus 400 shown in FIG. 9 is provided with a decoding means 2, a D/A conversion unit 13, and a data restructuring means 44. The data restructuring means 44 has an I picture memory 51, a B and P stream output unit 52, an MPEG-TS multiplexing unit 48, and a selector 49.

The I picture memory 51 is presented as an example of the image extraction means. The intra picture is extracted from the multiplexed coded data D1, and the data in accordance with the I picture of the intra picture is stored temporarily in the I picture memory 51. The I picture memory 51 is connected to the B and P stream output unit 52 that is presented as an example of the image interpolation means, and the B picture and P picture of fixed pattern having the motion vector (0, 0) of the difference value "0", are interpolated between the intra pictures extracted by means of the I picture memory 51.

The output of the above-mentioned MPEG-TS multiplexing unit 21 and the output of the B and P stream output unit 52 are connected to the selector 49 that is presented as an example of the selection means, the selector 49 is controlled so as to select the multiplexed coded data during the normal reproduction ①, on the other hand the selector 49 is controlled so as to select the output of the B and P stream output unit 52 during the special reproduction ②. The selector 49 is operated by a user by way of the operation unit for special reproduction not shown in the drawing as in the case of the first example and the second example.

The output of the selector 49 is connected to the MPEG-TS multiplexing unit 48 as in the case of the first and second examples, the MPEG-TS multiplexed coded data D1 or the coded data D4 supplied from the B and P stream output unit 52 is multiplexed continuously with the coded data in accordance with the audio information. The multiplexed coded data Dout is supplied to the digital television 7 or the like through the IEEE1394 communication cable 9.

Subsequently, the data structure of MPEG-TS will be described. In an exemplary data structure of MPEG-TS shown in FIG. 10, for example, a data area of 188 bytes is assigned to one transport packet 30 to transmit a plurality of coded data. The transport packet 30 is structured hierarchically, and 10 data areas are assigned to the low order hierarchy. In these data areas, synchronous byte 31 of 8 bits, error display 32 of 1 bit, unit start display 33 of 1 bit, transport packet priority 34 of 1 bit, packet identification information (PID) 35 of 13 bits, scramble control 36 of 2 bits, adaptation control 37 of 2 bits, cyclic counter 38 of 4 bits, adaptation field 39, and payload 310 are written.

7 data areas are assigned to the lower order hierarchy of the adaptation field 39. In these data areas, adaptation field length 91 of 8 bits, discontinuous display 92 of 1 bit, random access display 93 of 1 bit, stream priority display 94 of 1 bit, 5 flag 95, optional filed 96, conditional field 97, and M stuffing byte 98 of 8 bits are written.

To the lower order hierarchy of the optional field 96, 5 data areas are assigned. In these data areas, program clock reference standard value (PCR) 61 of 42+6 bits, original PCR 62 of 42+6 bits, splice countdown 63 of 8 bits, transport private data length and data 64, and adaptation field extension 65 are written.

The transport packet 30 of 188 bytes that has been divided into four ATM (Asynchronous Transfer Mode) packets (cell) is transmitted. A write area of 5 bytes for writing header information is added at the head of each four-divided bit stream of 47 bytes. In this write area, as the header information generated by multiplexing MPEG-TS, PCR (Program Clock Reference) that is the program clock standard reference value, PTS (Presentation on Time Stamp) that is the time management information of reproduction output, and DTS (Decoding Time Stamp) that is the time management information of decoding that are prescribed by MPEG system are written. These header information are written so that the data is arranged continuous correctly.

Figure 11:
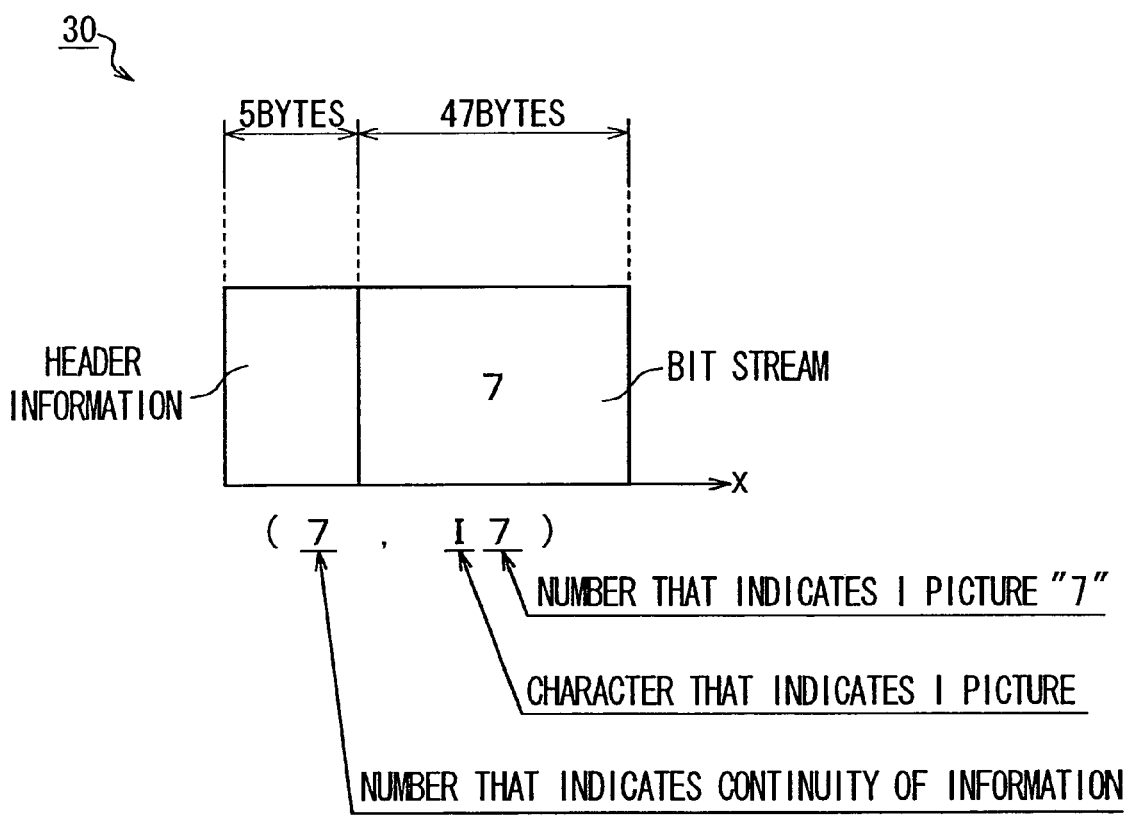
FIG. 11 is an image diagram for showing an exemplary data format of the bit stream according to the MPEG-TS system.

Subsequently, an exemplary data format of a bit stream in accordance with MPEG-TS system will be described. In an exemplary data format of a bit stream in accordance with MPEG-TS system shown in FIG. 11, the abscissa represents time t, the header information of 5 bytes is added to an MPEG video bit stream of 47 bytes.

In this example, "7" described under the header information is a number that indicates the continuity of the information. "I" of "I7" described under the bit stream "7" indicates intra picture, and "7" is a number for indicating I picture "7". Therefore, in the case of (4, B2) written in the exemplary bit stream shown in FIG. 13, the bit stream is "2", the number for indicating continuity of the information is "4", and "B" of "B2" indicates B picture.

Figure 12:
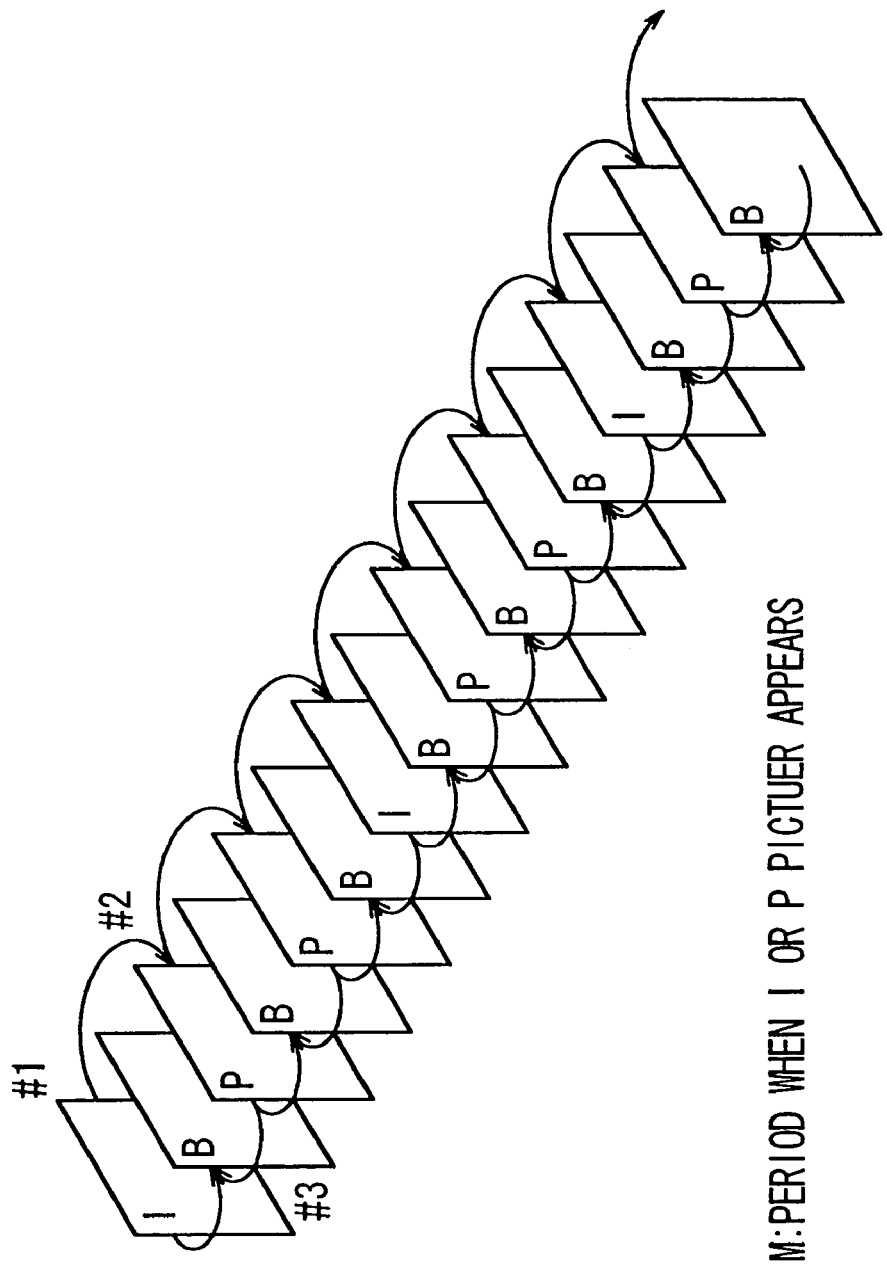
FIG. 12 is an image diagram for showing an exemplary structure of the bit stream in the case that the period M of I or P picture is 2.

The processing order of the bit stream for I and P pictures having a period M=2 will be described. M shown in FIG. 12 is a period of I picture or P picture appearance. In this example, the MPEG video stream is composed of I, B, P, B, P, B, I, B, P, B, P, B, I, B, and P pictures. At first I picture is subjected to image processing in #1, P picture is subjected to image processing in #2, and B picture located between I and P pictures is subjected to image processing in #3.

Figure 13:
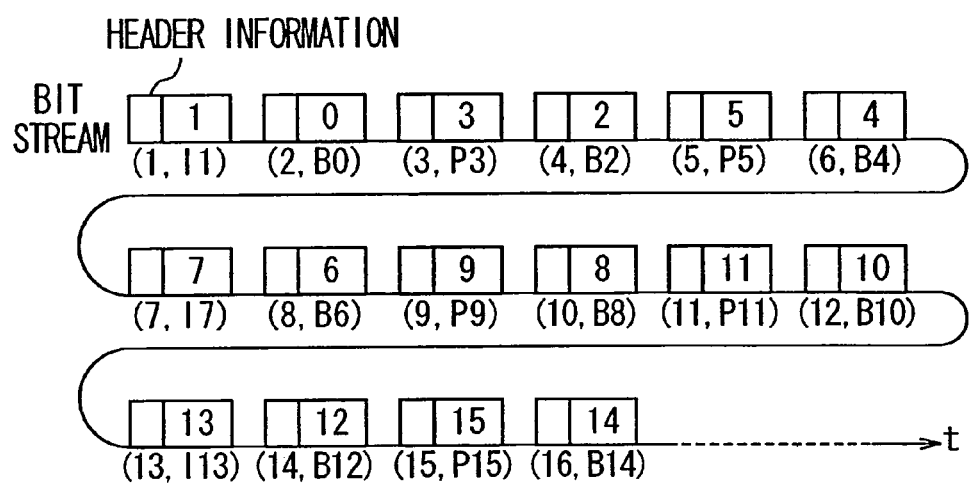
FIG. 13 is an image diagram for showing an exemplary structure of the bit stream for the normal reproduction.

Subsequently, an exemplary operation of the special reproduction transmission apparatus 400 will be described. FIG. 13 is an image diagram for illustrating an exemplary structure of a bit stream generated during the normal reproduction. In this example that involves the MPEG video stream recorded in the video audio information medium 50, the MPEG-TS multiplexed coded data D1 is used as it is, and the coded data Din is transmitted to the digital television 7 by way of the selector 49 and MPEG-TS multiplexing unit during the normal reproduction.

The MPEG video stream that has been restructured by means of the I picture memory 51 and B and P stream output unit 52 is used, and the coded data Dout is transmitted to the digital television 7 by way of the selector 49 and MPEG-TS multiplexing unit 48. In this example, because re-compression is not performed but multiplexing is performed as in the case of the first to third examples, the header information of PCR, PTS, and DTS is replaced to obtain correct continuity.

① In the case that the normal reproduction is selected, because the normal reproduction ① is selected by the selector 49, the MPEG video stream in accordance with the multiplexed video audio information medium 50 is supplied to the MPEG-TS multiplexing unit 48 as it is. The MPEG-TS multiplexing unit 48 multiplexes the MPEG-TS multiplexed coded data D1 with the coded data in accordance with the audio information. The multiplexed coded Data Dout is supplied to the digital television 7 though the IEEE 1394 communication cable 9.

In the exemplary bit stream shown in FIG. 13, I picture (1, I1) of bit stream "1", B picture (2, B0) of bit stream "0", P picture (3, P3) of bit stream "3", B picture (4, B2) of bit stream "2", P picture (5, P5) of bit stream "5", B picture (6, B4) of bit stream "4", I picture (7, I7) of bit stream "7", B picture (8, B6) of bit stream "6", P picture (9, P9) of bit stream "9", B picture (10, B8) of bit stream "8", P picture (11, P11) of bit stream "11", B picture (12, B10) of bit stream "10", I picture (13, I13) of bit stream "13", B picture (14, B12) of bit stream "12", P picture (15, P15) of bit stream "15", and B picture (16, B14) of bit stream "14", to each of which the header information is added, is supplied to the digital television 7 from the MPEG-TS multiplexing unit 48.

Figure 14:
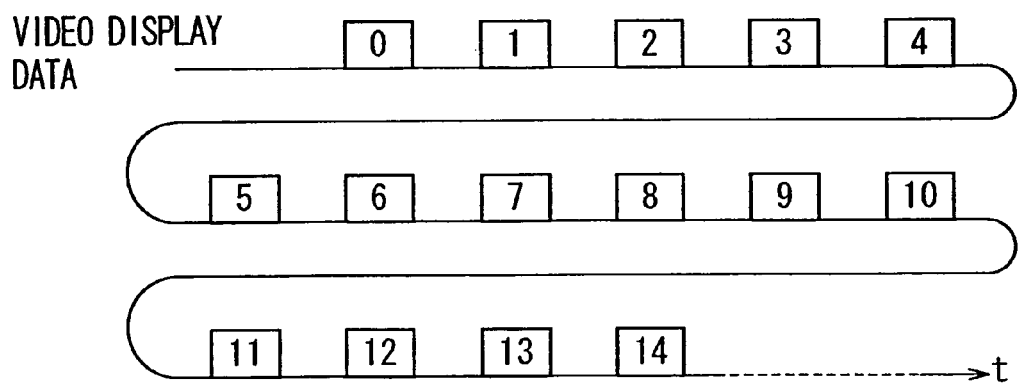
FIG. 14 is an image diagram for showing an exemplary structure of the video display data for the normal reproduction.

In the digital television 7, the MPEG decoder 11 shown in FIG. 3 decodes the coded Dout in accordance with the above-mentioned bit streams, and a continuous picture is digitally displayed based on the video display data that continues as 0 to 14 shown in FIG. 14.

Figure 15:
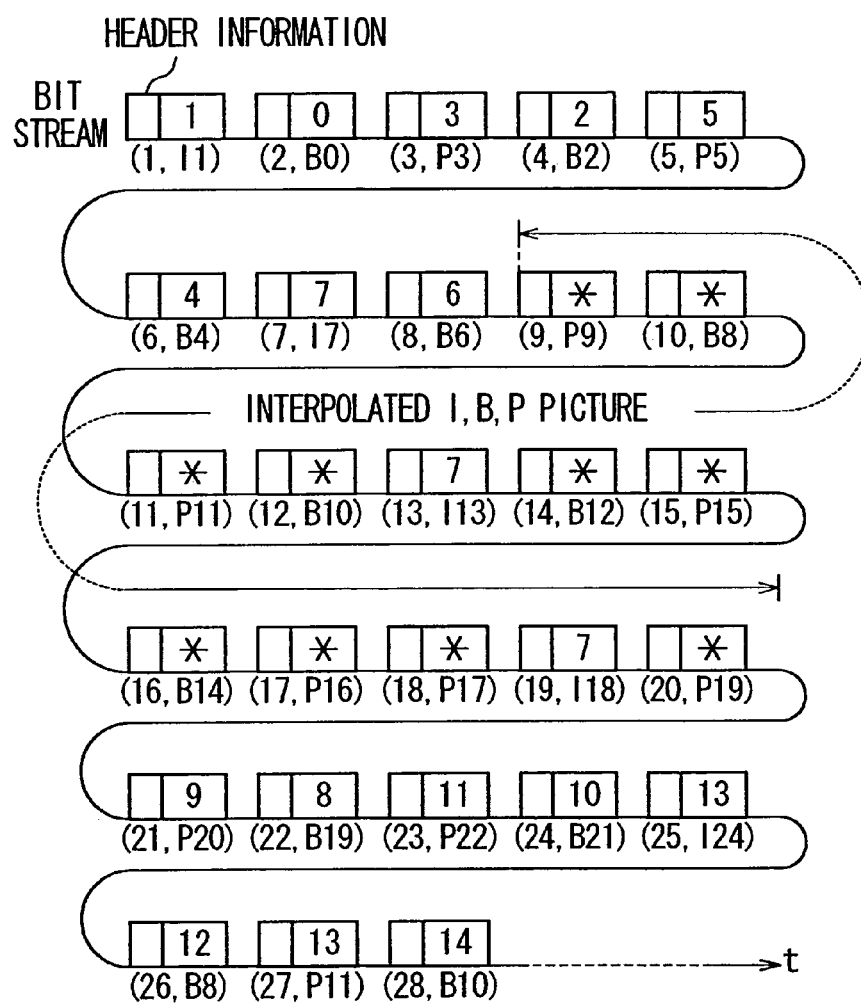
FIG. 15 is an image diagram for showing an exemplary structure of the bit stream for the pause reproduction (pause at I7).

② In the case that the special reproduction is selected, when I picture (7, I7) of bit stream "7" of the exemplary bit stream shown in FIG. 15 is pause-reproduced, the selector 49 is switched from the normal reproduction ① to the special reproduction ②. The intra picture is extracted from the multiplexed coded data D1 in the I picture memory 51, and the data in accordance with the I picture is stored temporarily. Therefore, in the B and P stream output unit 52 connected to the I picture memory 51, B picture and P picture having the fixed pattern of the motion vector (0, 0) of difference value "0" are generated base on intra pictures extracted with the I picture memory 51. PCR, PTS, and DTS prescribed according to MPEG system are added to the transport packet of the MPEG-TS as the header information so that the data string continues correctly.

In the exemplary bit stream shown in FIG. 15, I picture (1, I1) of bit stream "1", B picture (2, B0) of bit stream "0", P picture (3, P3) of bit stream "3", B picture (4, B2) of bit stream "2", P picture (5, P5) of bit stream "5", B picture (6, B4) of bit stream "4", I picture (7, I7) of bit stream "7", and B picture (8, B6) of bit stream "6", to each of which the header information is added, and subsequently P picture (9, I9) of bit stream that is newly generated and has the motion vector (0, 0) of the difference value "0" (referred to as bit stream "*" hereinafter), B picture (10, B8) of bit stream "*", P picture (11, P11) of bit stream "*", and B picture (12, B10) of bit stream "*" are interpolated.

Subsequently I picture (13, I13) that is the same as bit stream "7" is interpolated, then B picture (14, B12) of bit stream "*", P picture (15, P15) of bit stream "*", B picture (16, B14) of bit stream "*", P picture (17 P16) of bit stream "*", and P picture (18, P17) of bit stream "*" is interpolated, and I picture (19, I18) that is the same as bit stream "7" are subsequently interpolated.

Subsequently to the above, P picture (21, P20) of bit stream "9", B picture (22, B19) of bit stream "8", P picture (23, P22) of bit stream "11", B picture (24, B21) of bit stream "10", I picture (25, I24) of bit stream "13", B picture (26, B8) of bit stream "12", P picture (27, P11) of bit stream "13", and B picture (28, B10) of bit stream "14" are restructured.

Therefore, the correct bit stream in accordance with the pause reproduction static image is generated. The restructured coded data Dout in accordance with the pause screen at the arbitrary position is transmitted from the MPEG-TS multiplexing unit 48 to the digital television 7 or the like. In the digital television 7 that has received the coded data Dout, the MPEG2 decoder 11 shown in FIG. 3 decodes the coded data Dout in accordance with the above-mentioned bit stream, the video display data in accordance with the bit stream "7" served for pause time period is decoded subsequently to the video display data that continues as numerals 0 to 6 shown in FIG. 16. Bit stream "8" is not transmitted subsequently to bit stream "7", decoding processing is intermitted in waiting until bit stream "8" comes. During the intermittence, the image (picture) in accordance with bit stream "7" displayed finally is being displayed continuously. Subsequently, the video display data that continues as numerals 9 to 14 is decoded. Therefore, continuous pause picture is displayed on the digital television 7.

In the mode of fast forward reproduction or fast backward reproduction, only the intra picture in the stream is read out skippingly depending on the reproduction speed, multiplexed, and sent out. At that time, after the intra picture is read out, the next intra picture is read out after some jumping, a temporal interval occurs before the reading of the next intra picture. P and B picture stream having all the motion vectors (0, 0) of difference value "0" is supplied in order to display a static image during the temporal interval, and a correct stream is thereby formed in the receiver side.

As described hereinabove, in the special reproduction transmission apparatus 400 in accordance with the fourth example, because re-encoding (compression) is not performed during the special reproduction mode such as static reproduction, fast forward reproduction, or fast backward reproduction, and because the stream of P and B pictures of the fixed pattern having the motion vector (0, 0) of difference value "0" is interpolated to I picture, the data-restructured coded data Dout can be supplied to the digital television 7 only during the special reproduction as in the case of the second example.

Therefore, because the correct bit stream is decoded in the digital television (receiver side) 7, processing to supply the stream of P and B pictures of the fixed pattern having the difference value "0" suitably is repeated after the picture (I picture) to be paused is supplied, and the pause image is thereby reproduced endlessly on the receiver side. Because the stream of P and B picture having the motion vector (0, 0) of difference value "0" has a plain fixed pattern, a high performance MPEG video encoder 40 as used in the first example is not needed. As the result, the cost of the special reproduction transmission apparatus 400 is low.

(6) FIFTH EXAMPLE

Figure 17:
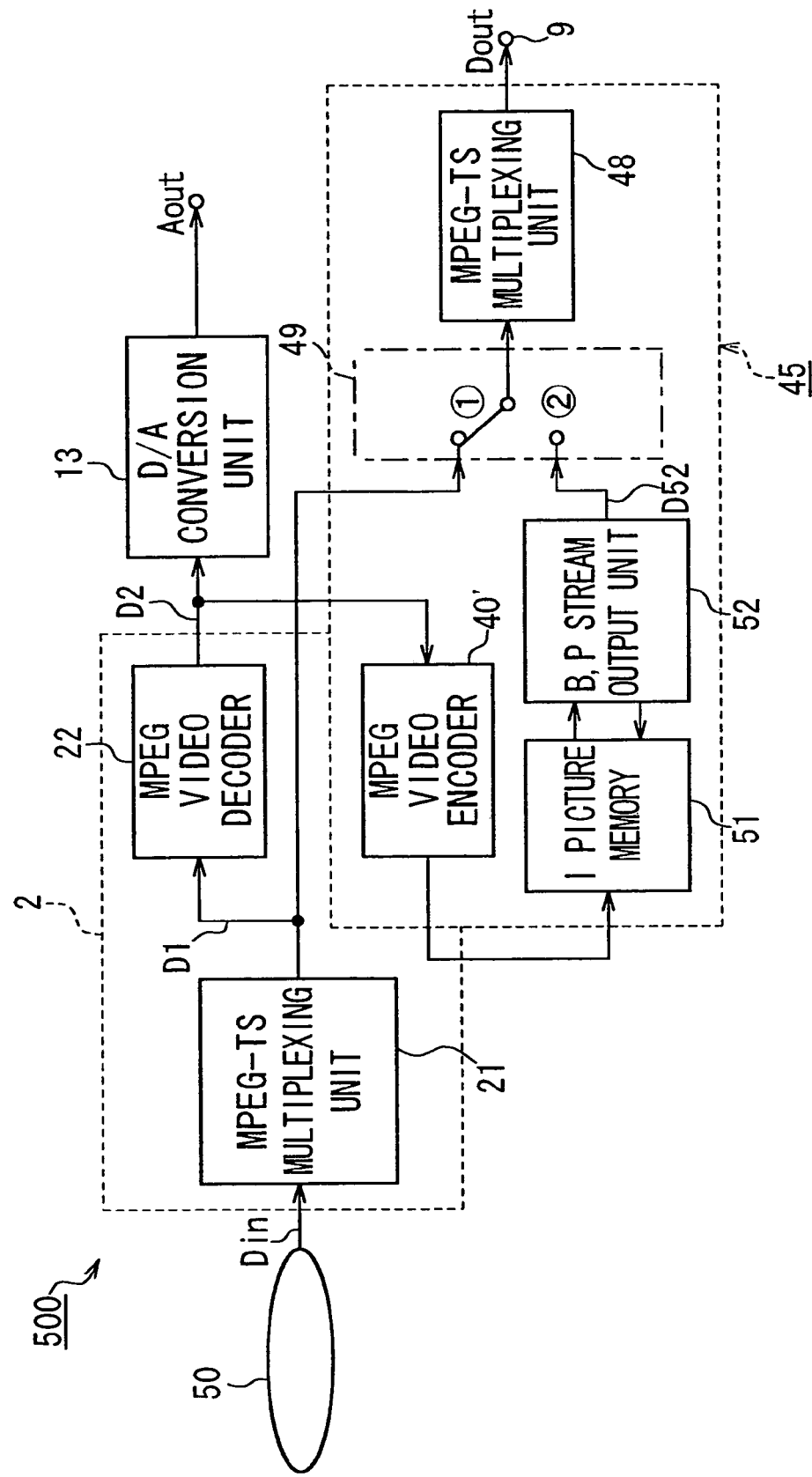
FIG. 17 is a block diagram for illustrating an exemplary structure of a special reproduction transmission apparatus 500 that is presented as the fifth example.

FIG. 17 is a block diagram for illustrating an exemplary structure of a special reproduction transmission apparatus 500 that is presented as the fifth example.

In the case of the above-mentioned fourth example, the pause image (static image) can be displayed only at I picture during the special reproduction, but the pause image can be displayed at an arbitrary picture in the fifth example. Furthermore, it is not necessary for an encoder to encode in real time and decoding of intra picture is sufficient, as the result the load is mitigated in comparison with the first to third examples. Therefore, soft encoding may be performed by use of the CPU.

In this example, re-encoding is performed during the special reproduction, and the bit stream of the intra picture obtained from the video audio information medium 50 and the bit stream of B and P picture of the fixed pattern having the motion vector (0, 0) of difference value "0" are used to generate a static image of the correct data string, and it is transmitted to a digital signal processing equipment.

The special reproduction transmission apparatus 500 shown in FIG. 17 is provided with a decoding means 2, a D/A conversion unit 13, and a data restructuring means 45. The data restructuring means 45 has an MPEG video encoder 40', an I picture memory 51, a B and P stream output unit 52, an MPEG-TS multiplexing unit 48, and a selector 49. Description of the components having the same names and the same characters as those described in the fourth example is omitted because these components has the same functions.

In the present example, the digital data S generated from an MPEG video decoder 22 of the decoding means 2 is supplied to the MPEG video encoder 40'. The coded data D5 re-encoded by the MPEG video encoder 40' is stored temporarily in the I picture memory 51. For example, the I picture memory 51 extracts the intra picture from the re-encoded coded data D51, and the data in accordance with the I picture is stored temporarily in the I picture memory 51. The I picture memory 51 is connected to the B and P stream output unit 52 in the same manner as in the fourth example, B picture and P picture of the fixed pattern having the motion vector (0, 0) of difference value "0" is interpolated between intra pictures extracted by the I picture memory 51. The B picture that is to be interpolated herein is the stream generated so as to refer only to the previous (past) picture (image).

The output of the MPEG-TS multiplexing unit 21 of the above-mentioned decoding means 2 and the output of the B and P stream output unit 52 are connected to the selector 49. During the normal reproduction ①, the selector is controlled so as to select the multiplexed coded data D1, and on the other hand during the special reproduction ②, the selector 49 is controlled so as to select the output of the B and P stream output unit 52. The selector 49 is operated by a user by way of an operation unit for special reproduction not shown in the drawing as in the case of the first and second examples.

The output of the selector 49 is connected to the MPEG-TS multiplexing unit 48 as in the case of the fourth example, the MPEG-TS multiplexed coded data D1 or the coded data D52 supplied from the B and P stream output unit 52 is multiplexed with the coded data in accordance with the audio information. The multiplexed coded data Dout is supplied to the digital television 7 or the like through the IEEE1394 communication cable 9.

Subsequently, an exemplary operation of the special reproduction transmission apparatus 500 will be described. In the present example, during the normal reproduction, the MPEG-TS multiplexed coded data D1 is used as it is as in the case of the fourth example, and the coded data Din is transmitted to the digital television 7 by way of the selector 49 and the MPEG-TS multiplexing unit 48.

On the other hand during the special reproduction, the MPEG video stream restructured by the I picture memory 51 and the B and P stream output unit 52 is used, and the coded data Dout is transmitted to the digital television 7 by way of the selector 49 and the MPEG-TS multiplexing unit 48.

Figure 18:
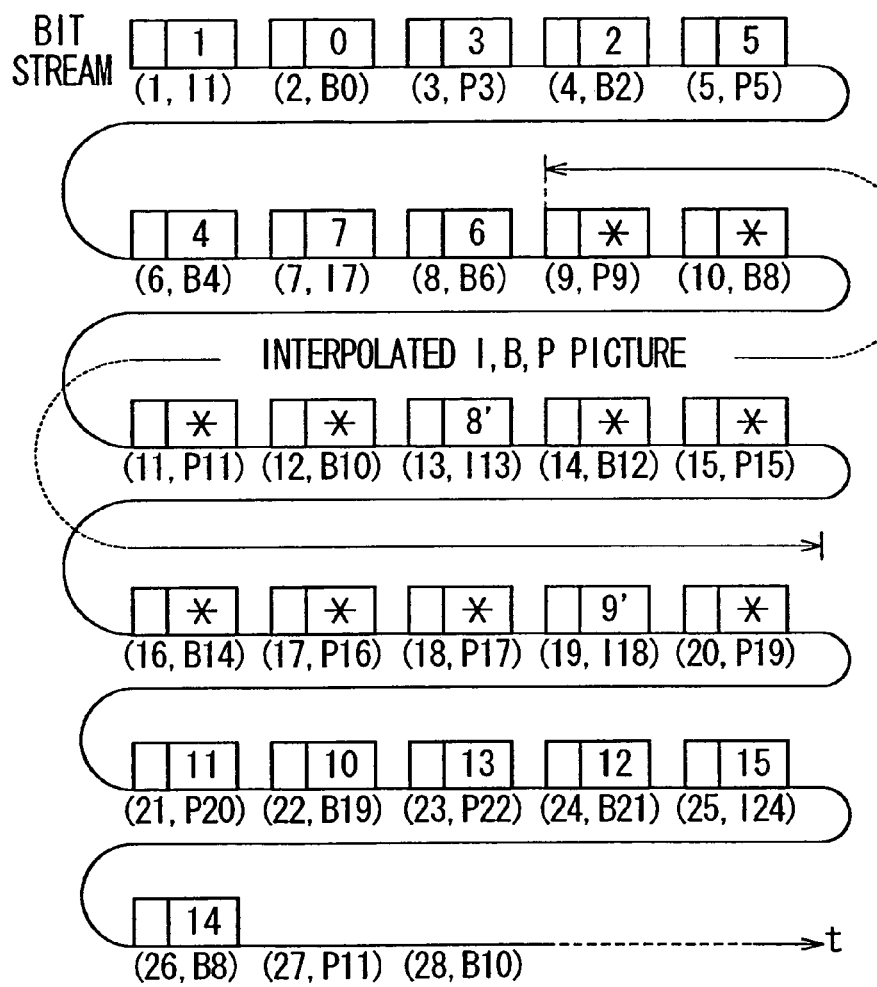
FIG. 18 is an image diagram for showing an exemplary structure of the bit stream for the pause reproduction (pause at I7).

At that time, it is assumed that the bit stream "8" is re-encoded with I picture during the time period paused with bit stream "7", and that bit stream "9" is re-encoded during the time period being paused with bit stream "8". In FIG. 18, bit stream "8" is a bit stream that is formed by re-encoding the picture of bit stream "8" with I picture, and bit stream "9'" is a bit stream that is formed by re-encoding the picture of bit stream "9" with I picture.

① In the case that the normal reproduction is selected, the processing is the same as that in the case of the fourth example, and the description is omitted. The processing is referred to FIG. 13 and FIG. 14.

② In the case that the special reproduction is selected, for example in the exemplary bit stream shown in FIG. 18, I picture (7, I7) of bit stream "7" is used for pause reproduction, and the selector 49 is switched from the normal reproduction ① to the special reproduction ②. In the I picture memory 51, the intra picture is extracted from the multiplexed coded data D1, and the data in accordance with the I picture is stored temporarily. Therefore, in the B and P stream output unit 52 connected to the I picture memory 51, the B picture and P picture having the motion vector (0, 0) of difference value "0" is generated base on the intra pictures extracted by the I picture memory 51. PCR, PTS, and DTS prescribed according to the MPEG system are added to the transport packet or the like of the MPEG-TS as the header information so that the data continues correctly.

In the exemplary bit stream shown in FIG. 18, I picture (1, I1) of bit stream "1", B picture (2, B0) of bit stream "0", P picture (3, P3) of bit stream "3", B picture (4, B2) of bit stream "2", P picture (5, P5) of bit stream "5", B picture (6, B4) of bit stream "4", I picture (7, I7) of bit stream "7", and B picture (8, B6) of bit stream "6", to each of which the header information is added, and P picture (9, P9) of the bit stream that is newly generated and has the motion vector (0, 0) of difference value "0" (referred to as bit stream "*" hereinafter) are interpolated.

Subsequently to the above, B picture (10, B8) of bit stream "*", P picture (11, P11) of bit stream "*", and B picture (12, B10) of bit stream "*" are interpolated. Subsequently to the above, I picture (13, I13) of bit stream "8'" is interpolated, and B picture (14, B12) of bit stream "*", P picture (15, P15) of bit stream "*", B picture (16, B14) of bit stream "*", P picture (17, P17) of bit stream "*", and B picture (18, B16) of bit stream "*" are subsequently interpolated.

Subsequently to the above, I picture (19, I18) of bit stream "9'" is interpolated, and B picture (20, B17) of bit stream "*", P picture (21, P20) of bit stream "11", B picture (22, B19) of bit stream "10", Ppicture (23, P22) of bit stream "13", B picture (24, B21) of bit stream "12", I picture (25, I24) of bit stream "15", and B picture (26, B8) of bit stream "14" are supplied subsequently from the MPEG-TS multiplexing unit to the digital television 7 or the like.

Figure 19:
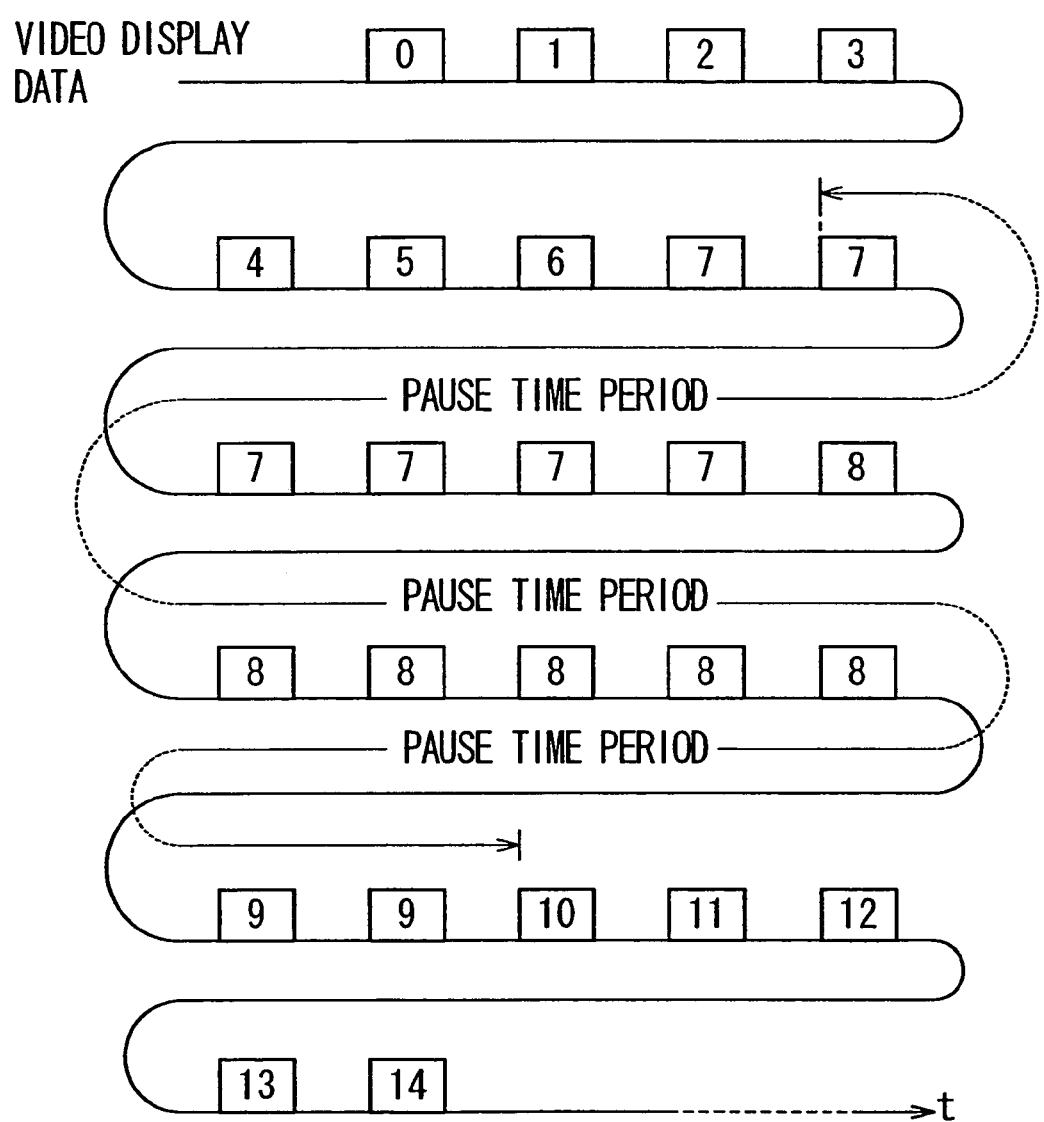
FIG. 19 is an image diagram for showing an exemplary structure of the video display data for the pause reproduction (pause at I7).

In the digital television 7 that has received the MPEG video stream, the MPEG2 decoder 11 shown in FIG. 3 decodes the coded data Dout in accordance with the above-mentioned bit stream, and decodes the video display data in accordance with bit stream "7" consecutively 6 times correspondingly to the pause time period subsequent to the video display data that continues as the numerals 0 to 6 shown in FIG. 19, furthermore the video display data in accordance with bit stream "8" is decoded consecutively 5 times, and the video display data in accordance with bit stream "9" is decoded consecutively 2 times. After the above, the video display data that is continuous as the numerals 10 to 14 is decoded. Therefore, continuous picture is displayed on the digital television 7.

As described hereinabove, in the case of the special reproduction transmission apparatus in accordance with the fifth example, because re-encoding is performed and the stream having the motion vector (0, 0) of difference value "0" is interpolated to I picture during the special mode reproduction such as static reproduction, fast forward reproduction, or fast backward reproduction, the data-restructured coded data Dout is transmitted to the digital television 7 only during the special reproduction as in the case of the second example.

Therefore, when re-pausing is performed at an arbitrary position during the pause time period, only the picture, not only the I picture, is re-encoded with I picture to thereby restructure the MPEG video stream, and the correct bit stream is decoded in the digital television (receiver side) 7 as in the case of fourth example.

Furthermore, because re-encoding is performed during the pause time period, the motion detection is not needed, and real time re-encoding is not needed. Therefore, a low speed encoder may be used as the MPEG video encoder 40', and the re-encoding process by use of a software is sufficient for the purpose. A high performance MPEG video encoder 40 as used in the first example is not necessary. Accordingly, the cost of the special reproduction transmission apparatus 400 is low.

(7) SIXTH EXAMPLE

Figure 20:
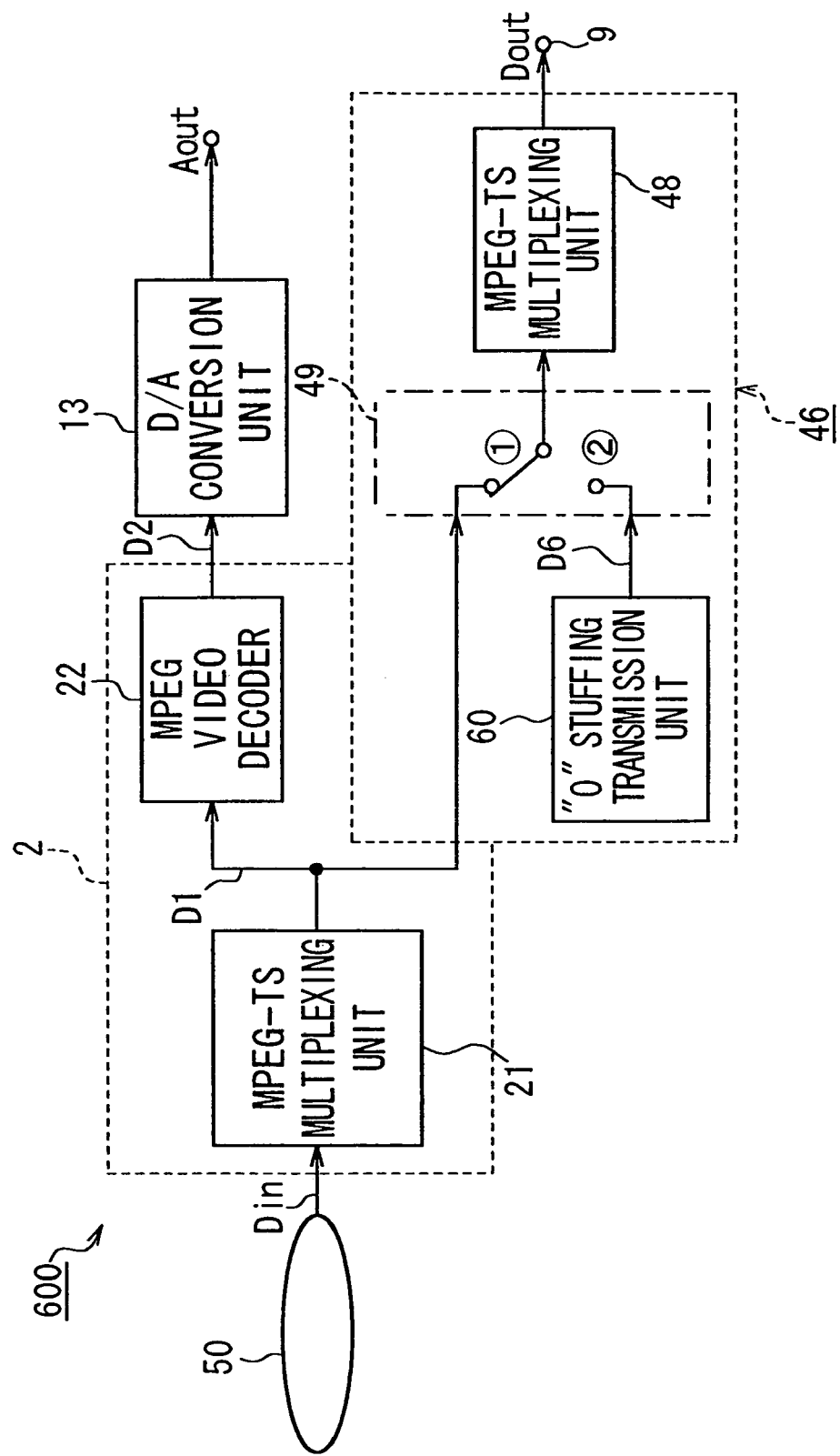
FIG. 20 is a block diagram for illustrating an exemplary structure of a special reproduction transmission apparatus 600 that is presented as the sixth example.

FIG. 20 is a block diagram for illustrating an exemplary structure of a special reproduction transmission apparatus 600 that is presented as the sixth example.

In the present example, the MPEG vide stream recorded in the video audio information medium 50 is used as it is during the normal reproduction, and otherwise "0" stuffing bit is sent out. Because re-multiplexing is performed, the discontinuous point of the MPEG-TS does not occur. In the receiver side, the data is decoded if it can be decoded, on the other hand the screen is fixed (freeze) and the next decodable data is waited if the data cannot be decoded. Thereby, simple special reproduction is performed.

The special reproduction transmission apparatus 600 shown in FIG. 20 is provided with a decoding means 2, a D/A conversion unit 13, and a data restructuring means 46. The data restructuring means 46 has a stuffing output unit 60, an MPEG-TS multiplexing unit 48, and a selector 49. Description of the components having the same names and the same characters as those of the fourth and fifth examples is omitted because these component have the same functions.

The "0" stuffing output unit 60 that is presented as the data generation means generates "0" stuffing bit that constitutes the coded data for a digital signal processing equipment. The reason whey the "0" stuffing bit is transmitted is that whether the transmission of the MPEG video stream ends or not cannot be detected if no stream is transmitted. As a matter of fact, in some cases the transmission processing of the stream is actually interrupted, it is necessary to identify the case.

Figure 10:
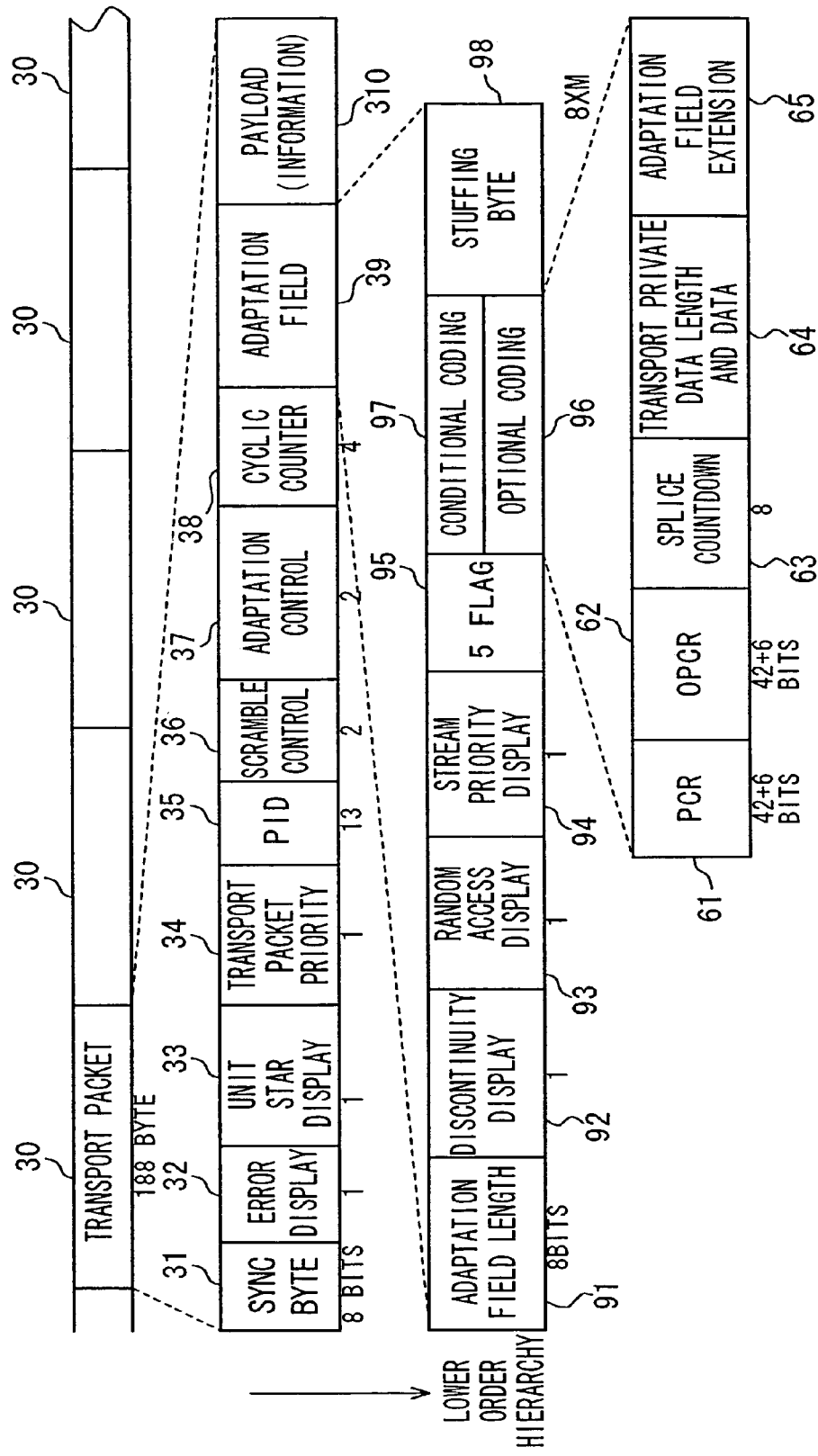
FIG. 10 is a format for showing an exemplary structure of MPEG-TS.

"0" stuffing bit is written in the stuffing byte 98 of the lower order hierarchy of the adaptation field 39 of the transport packet 30 in the exemplary data structure of the MPEG-TS shown in FIG. 10. In the present example, the sequence stream start/end code may be added on the head or tail of the MPEG video stream. The code functions to structure the MPEG video stream that is conformable to the standard more closely.

The output of the MPEG-TS multiplexing unit 21 of the above-mentioned decoding means 2 and the output of the "0" stuffing output unit 60 are connected to the selector 49, and the selector 49 is controlled so as to select the multiplexed coded data D1 during the normal reproduction ①, on the other hand the selector 49 is controlled so as to select the output of the "0" stuffing output unit 60 during the special reproduction ②. The selector 49 is operated by a user by way of the operation unit for special reproduction not shown in the drawing as in the case of the first to fifth examples.

The output of the selector 49 is connected to the MPEG-TS multiplexing unit 48 as in the case of the fourth and fifth examples, and the MPEG-TS multiplexed coded data D1 or the coded data D6 supplied from the "0" stuffing output unit 60 is multiplexed with the coded data in accordance with the audio information. The multiplexed coded data Dout is supplied to the digital television or the like by way of the IEEE 1394 communication cable 9.

Subsequently, an exemplary operation of the special reproduction transmission apparatus 600 will be described. In the present example, the MPEG-TS multiplexed coded D1 is used as it is as in the case of the fourth and fifth examples during the normal reproduction, and the coded data Dout is transmitted to the digital television 7 by way of the selector 49 and the MPEG-TS multiplexing unit 48. On the other hand, during the special reproduction, re-encoding is not performed and only re-multiplexing is performed. In detail, the MPEG video stream that is restructured by "0" stuffing bit supplied from the "0" stuffing output unit 60 shown in FIG. 20 is used, and the coded data Dout is transmitted to the digital television 7 by way of the selector 49 and the MPEG-TS multiplexing unit 48.

① In the case that the normal reproduction is selected, the processing to be performed is quite the same as that performed in the fourth and fifth examples, and the description is omitted. The processing is referred to FIG. 13 and FIG. 14.

Figure 21:
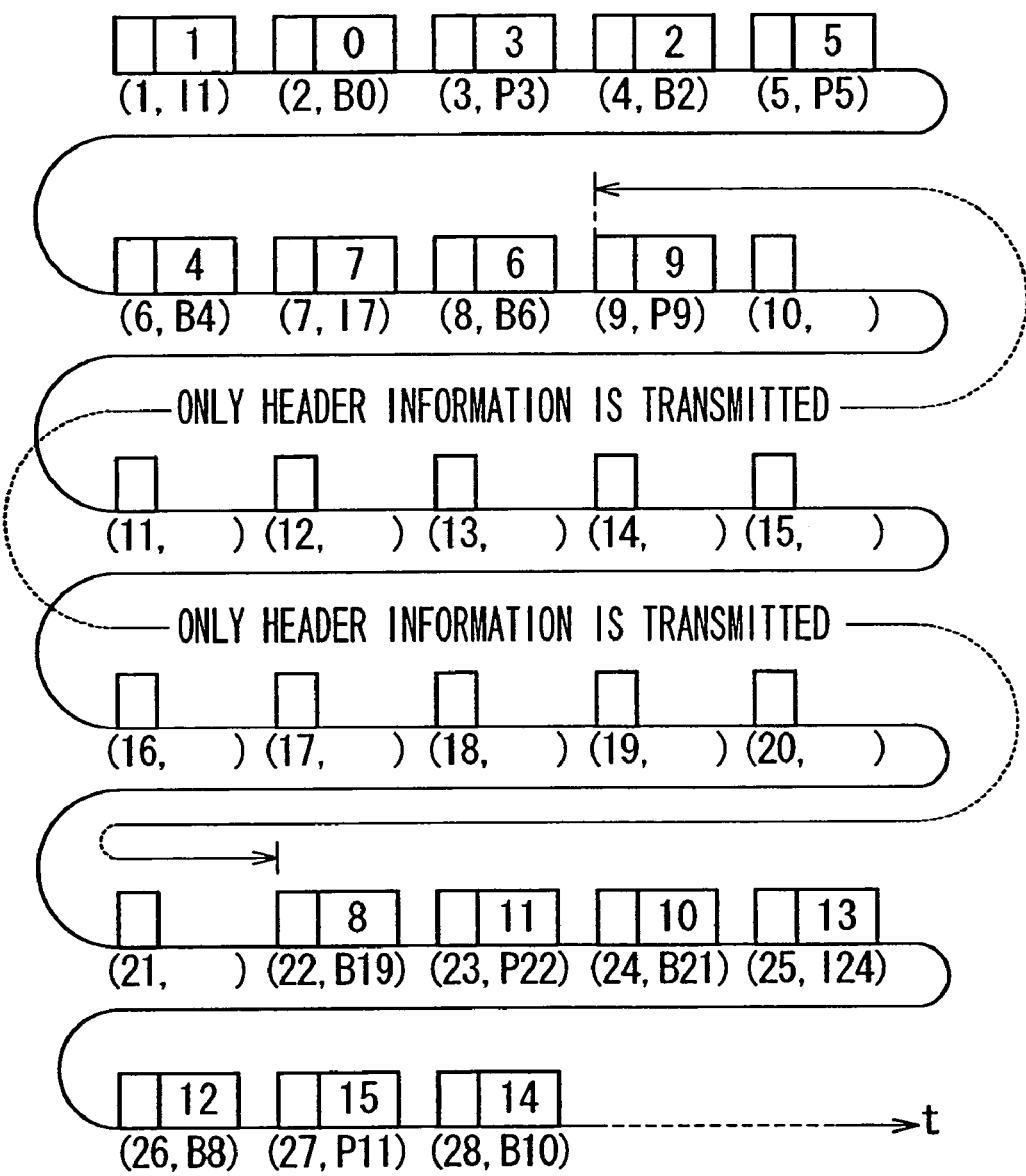
FIG. 21 is an image diagram for showing an exemplary structure of the bit stream for the pause reproduction (pause at I7).

② In the case that the special reproduction is selected, for example, the bit stream shown in FIG. 21 is pause-reproduced with I picture (7, I7) of bit stream "7", the selector 49 is switched from the normal reproduction ① to the special reproduction ②. The "0" stuffing output unit 60 generates "0" stuffing bit that constitutes the coded data that is necessary for the digital television 7 so as to write it on the stuffing byte 98 of the lower order hierarchy of the adaptation field 39 of the transport packet 30 in the exemplary data structure of the MPEG-TS shown in FIG. 10. PCR, PTS, and DTS prescribed according to the MPEG system are added to the transport packet of the MPEG-TS as the header information so that the data continues correctly.

In the exemplary bit stream shown in FIG. 21, I picture (1, I1) of bit stream "1", B picture (2, B0) of bit stream "0", P picture (2, P3) of bit stream "3", B picture (4, B2) of bit stream "2", P picture (5, P5) of bit stream "5", B picture (6, B4) of bit stream "4", I picture (7, I7) of bit stream "7", B picture (8, B6) of bit stream "6", P picture (9, I9) of bit stream "9", to each of which the header information is added, and then the header information (10,) to the header information (21,), on each of which "0" stuffing bit is written, are interpolated.

Subsequently, B picture (22, B19) of bit stream "8", P picture (23, P22) of bit stream "11", B picture (24, B21) of bit stream "10", I picture (25, I24) of bit stream "13", B picture (26, B8) of bit stream "12", P picture (27, P11) of bit stream "15", B picture (28, B10) of bit stream "14" are transmitted from the MPEG-TS multiplexing unit 48 to the digital television 7.

Figure 16:
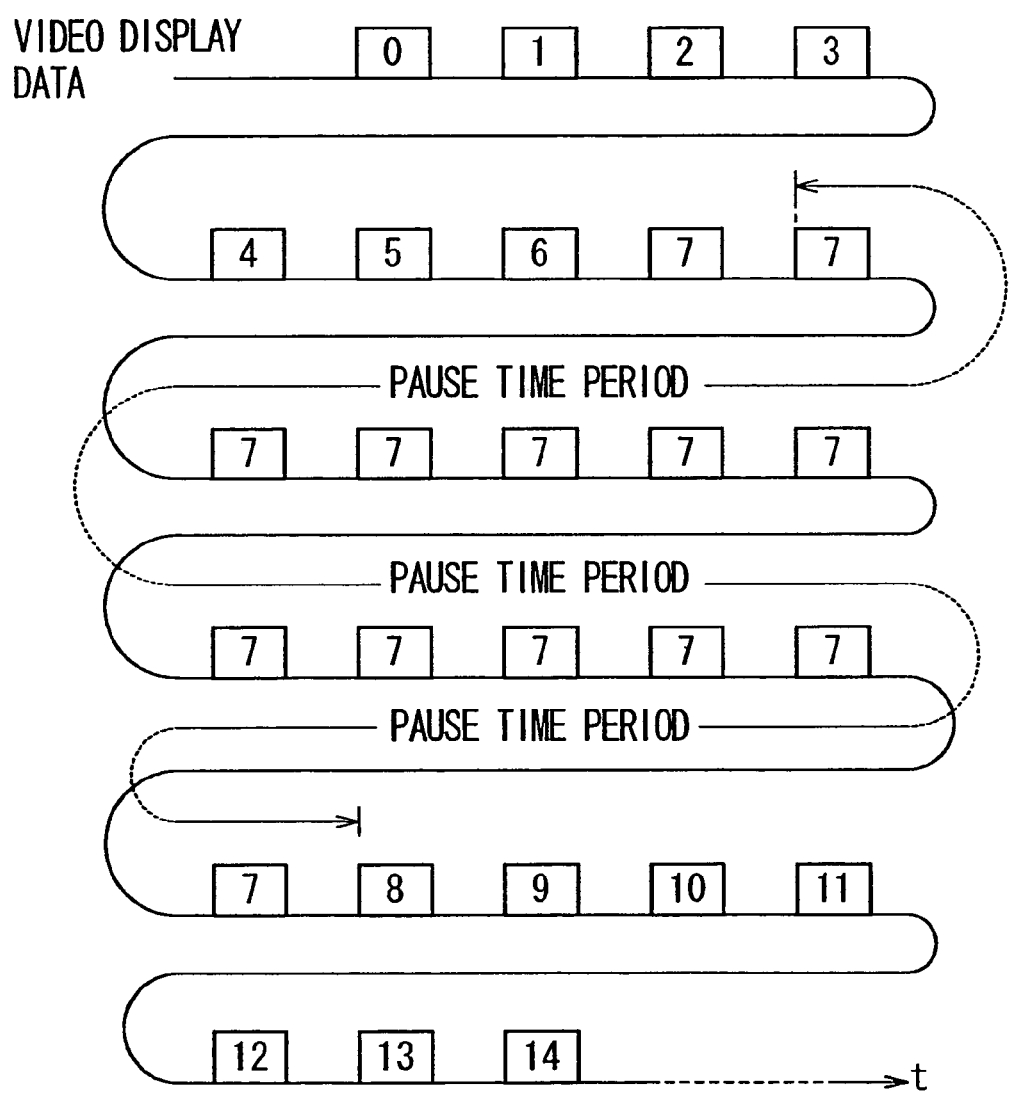
FIG. 16 is an image diagram for showing an exemplary structure of the video display data for the pause reproduction (pause at I7).

In the digital television 7 that has received the bit stream, the MPEG2 decoder 11 shown in FIG. 3 decodes the coded data Dout in accordance with the above-mentioned bit stream, and then decodes the video display data in accordance with bit stream "7" for the pause time period subsequently to the video display data that is continuous as the numerals 0 to 6 shown in FIG. 16. Because bit stream "8" that is to be subsequent to bit stream "7" is not transmitted, the decoding intermits in waiting until the bit stream comes. During the intermittence, the image (picture) in accordance with bit stream "7", which is displayed latest, is being displayed continuously. Subsequently, the video display data that is continuous as the numerals 9 to 14 is decoded (refer to the fourth example). Therefore, the continuous pause image is displayed on the digital television 7.

As described hereinabove, in the special reproduction transmission apparatus 600 in accordance with the sixth example, the header information (10,) to header information (21,), on each of which "0" stuffing bit is written on the portion between bit stream "9" and bit stream "8", are interpolated in fragments during the special reproduction.

Therefore, the continuous MPEG-TS multiplexing during and around the pause time period and transmission of the header information during the pause time period are allowed to be performed, and the transmission of the MPEG video stream during the pause time period can be intermitted. The fragmented bit stream as described hereinabove is decoded in the receiver side to be thereby digitally displayed on the digital television 7.

It is desirable that the information transmission rule is set so that the screen display is fixed at a picture prior to the picture that is specified to be paused when the MPEG video stream cannot be decoded because of intermittence of the MPEG video stream. "The coded data is decoded if the coded data can be decoded, otherwise the screen is fixed (freeze) at the latest decoded data and waits until the next decodable data if the coded data cannot be decoded" is not guaranteed to the operation of the receiver side.

Therefore, the receiver can be a receiver that mutes the screen when "0" stuffing bit continues depending on the receiver, or can be a receiver that does not display the static image. To ensure the data transmission, it is desirable to set the information transmission rule as described hereinabove between the transmission side and the receiver side. In the case that the information transmission rule is established, it is not necessary for the transmission side to transmit the stream during fixed screen display of the receiver side, and the data transfer processing can be mitigated.

(8) SEVENTH EXAMPLE

Figure 22:
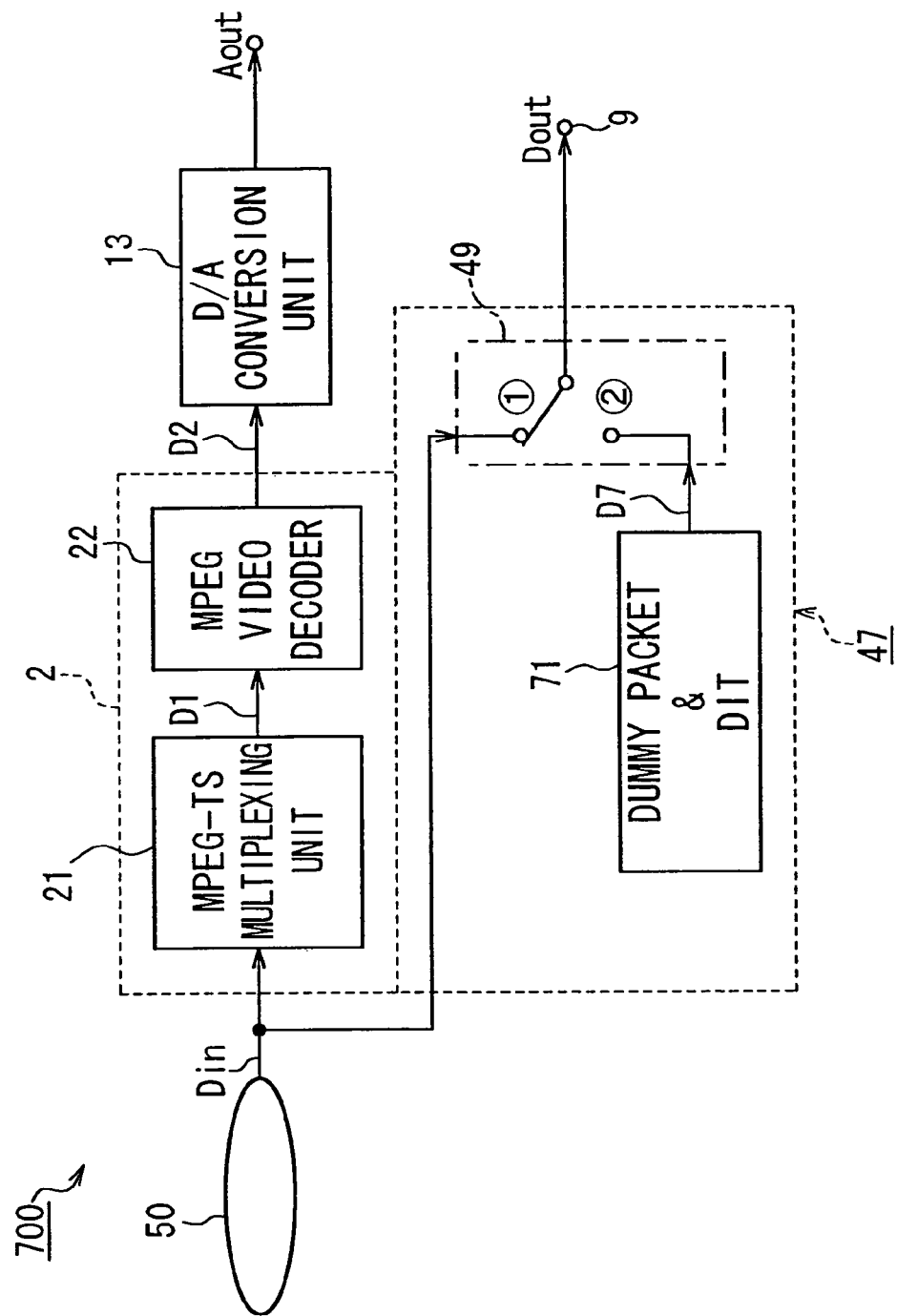
FIG. 22 is a block diagram for illustrating an exemplary structure of a special reproduction transmission apparatus 700 that is presented as the seventh example.

FIG. 22 is a block diagram for illustrating an exemplary structure of a special reproduction transmission apparatus 700 that is presented as the seventh example.

In the present example, multiplexing, which is performed in the sixth example, is not performed during the normal reproduction. Furthermore, re-compression is not performed as in the case of the sixth example, the coded data Din obtained from the video audio information medium 50 is transferred as it is to the digital signal processing equipment, the dummy packet is interpolated to the portion where the bit stream is intermittent and transmitted to the digital signal processing equipment during the special reproduction. Thereby, the screen is fixed (freeze) in waiting in the receiver side.

In the case of DVB (Digital Video Broadcasting) that is the digital broadcasting standard in Europe, DIT (Discontinuity Information Table) is interpolated to the discontinuous point of the bit stream in accordance with the MPEG-TS. In the case of not DVB, DIT may not be interpolated to the discontinuous point. Therefore, no MPEG vide stream is transmitted during the pause time period.

The special reproduction transmission apparatus 700 shown in FIG. 22 is provided with a decoding means 2, a D/A conversion unit 13, and a data restructuring means 47. The data restructuring means 47 has a dummy packet & DIT output unit 71, an MPEG-TS multiplexing unit 48, and a selector 49. Description of the components having the same names and the same characters as those described in the fourth to sixth examples is omitted because the components have the same functions.

The dummy packet & DIT output unit 71 that is presented as an exemplary data generation means generates the dummy packet that constitutes the coded data for the digital signal processing equipment or DIT. The term "dummy packet" means a packet having only header without data, which is described as format (fmt)="MPEG" in CIP (Common Isochronus Packet) header.

The reason why the dummy packet is transmitted is that because whether transmission of the MPEG video stream ends or not, or whether transmission of the stream is interrupted or not cannot be determined as in the case of the sixth example if no stream is transmitted. Transmission of the dummy packet helps easy determination. The information transmission rule (table) that DIT is interpolated to the discontinuous point if the bit stream in accordance with the MPEG-TS is discontinuous is established in the DVB (Digital Video Broadcasting) that is the digital broadcasting standard in Europe. The seventh example is an example that is according to the DVB. Of course, it is not necessary to interpolate DIT if the bit stream is not discontinuous.

The dummy packet & DIT information D7 is sent out at the same timing as the transmission timing of the transport packet 30. The CIP of only the header having the description fmt="MPEG" is transmitted to the digital signal processing equipment during the special reproduction. For example, the CIP is the data to be transmitted during the pause of the MPEG vide stream.

Thereby, CIP functions as the alternative to the identifier flag of "fix (freeze) display screen" in the receiver side such as a digital television 7 or the like. For example, in the receiver side, the screen is being fixed during fmt="MPEG", or the screen display is being muted.

The input of the MPEG-TS multiplexing unit 21 of the above-mentioned decoding means 2 and the output of the dummy packet & DIT output unit 71 are connected to the selector 49, and the selector 49 is controlled so as to select the coded Data Din obtained from the video audio information medium 50 during the normal reproduction ①, on the other hand the selector 49 is controlled so as to select the output of the dummy packet & DIT output unit 71 during the special reproduction ②. The selector 49 is operated by a user by way of the operation unit for special reproduction not shown in the drawing as in the case of the first to fifth examples. The output of the selector 49 is connected directly to the digital television 7 or the like through the IEEE1394 communication cable 9.

In the present example, an information transmission rule for controlling so that the screen display is being fixed in waiting if the DIT information interpolated in the MPEG-TS is detected and so that the MPEG video image is displayed as it is if decoding of the coded data Din is re-started may be set in the receiver side such as the digital television 7 or the like.

Otherwise, an information transmission rule for controlling so that no data is transmitted or the CIP for indicating fmt="NO DATA" is transmitted when the MPEG video stream is broken off may be set. The packet of PCR (Program Clock Reference standard value) prescribed by the MPEG-TS, PAT (Program Association Table), and PMT (Program Map Table) are being transmitted continuously even while the screen is being fixed.

Subsequently, an exemplary operation of the special reproduction transmission apparatus 700 will be described. In the present example, differently from the fourth example and the fifth example, the coded data Din obtained from the video audio information medium 50 is used as it is and the coded data Din is transmitted to the digital television 7 by way of the selector 49 during the normal reproduction. During the special reproduction, re-encoding and re-multiplexing are not performed, and the coded data Dout is transmitted to the digital television 7 by way of the selector 49 using the dummy packet & DIT information D7 supplied from the dummy packet & DIT output unit 71 shown in FIG. 22.

① In the case that the normal reproduction is selected, the coded data Din obtained from the video audio information medium 50 is used as it is, and the coded data Din is transmitted to the digital television 7 by way of the selector 49.

Figure 23:
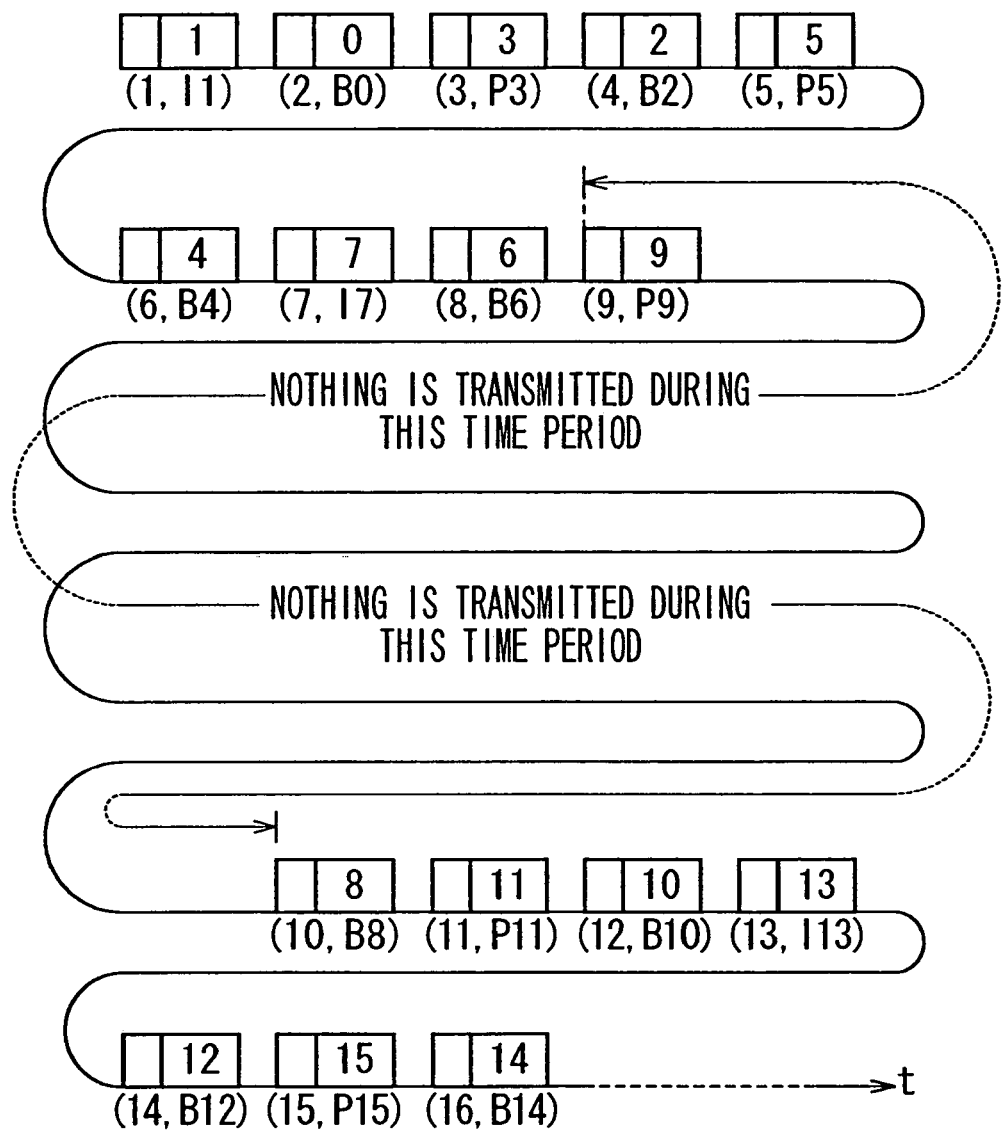
FIG. 23 is an image diagram for showing an exemplary structure of the bit stream for the pause reproduction (pause at I7).

② In the case that the special reproduction is selected, for example, in the case that the pause reproduction is performed at I picture (7, I7) of bit stream "7" of the exemplary bit stream shown in FIG. 23, the selector 49 is switched from the normal reproduction ① to the special reproduction ②. The dummy packet & DIT output unit 71 transmits the dummy packet & DIT information D7 as the coded data that is needed for the digital television 7. PCR, PAT, and PMT prescribed according to MPEG system are added as the header information.

In the exemplary bit stream shown in FIG. 23, I picture (1, I1) of bit stream "1", B picture (2, B0) of bit stream "0", P picture (3, P3) of bit stream "3", B picture (4, B2) of bit stream "2", P picture (5, P5) of bit stream "5", B picture (6, B4) of bit stream "4", I picture (7, I7) of bit stream "7", B picture (8, B6) of bit stream "6", to each of which the header information is added, are transmitted, and no picture is transmitted between the P picture (9, I9) of subsequent bit stream "9" and the B picture (10, B8) of bit stream "8".

Subsequently to the B picture (10, B8) of bit stream "8", P picture (11, P11) of bit stream "11", B picture (12, B10) of bit stream "10", I picture (13, I13) of bit stream "13", B picture (14, B 12) of bit stream "12", P picture (15, P15) of bit stream "15", and B picture (16, B14) of bit stream "14" are transmitted from the video audio information medium 50 to the digital television 7 or the like.

In the digital television 7 that has received the bit stream, the MPEG2 decoder 11 shown in FIG. 3 decodes the coded data Dout in accordance with the above-mentioned bit stream, and then decodes the video display data in accordance with bit stream "7", as the pause time period subsequently to the video display data that is continuous as the numerals 0 to 6 shown in FIG. 16. Because bit stream "8" that is subsequent to bit stream "7" is not transmitted, decoding processing is intermitted in waiting until the bit stream comes. During the intermittence, the image (picture) in accordance with bit stream "7" that is displayed latest is being displayed continuously. Subsequently, the video display data that is continuous as the numerals 9 to 14 is decoded (refer to the fourth example).

When DIT is detected, the screen display is fixed in waiting until the coded data Dout can be decoded for preparation of discontinuity. When decoding is re-started, display is performed based on the MPEG video stream. Therefore, continuous pause image is displayed on the receiver side.

Furthermore, in the case that DIT is not described, though the detection that the bit stream is "discontinuous point" is delayed, "discontinuity" can be detected based on the discontinuity of PCR described in the header information or various parameters of the cyclic counter 38 (refer to FIG. 10) which is allocated to the MPEG-TS transport packet 30.

Therefore, by performing the same processing as that performed in DIT detection, the continuous pause image is displayed on the receiver side.

As described hereinabove, in the special reproduction transmission apparatus 700 in accordance with the seventh example, the dummy packet is transmitted between bit stream "9" and bit stream "8" during the special reproduction. Even if transmission of the MPEG video stream is intermitted during the pause time period, the receiver side such as the digital television 7 or the like decodes the CIP that functions as the alternative to the identifier flag for "display screen is fixed (freeze)" and recognizes fmt="MPEG", and the screen is being fixed in the receiver side during fmt="MPEG", or the screen display is being muted.

Furthermore, because the coded data obtained from the MPEG-TS video audio recording medium 50 and the MPEG satellite broadcast is transferred directly to the digital television 7 or the like through the IEEE 1394 communication cable 9, the MPEG vide encoder, which is necessary for the first to fifth examples, is not necessary, and also the MPEG-TS multiplexing unit is not necessary, the cost of the special reproduction transmission apparatus 700 is significantly low.

As described hereinabove, according to the data reproduction transmission apparatus in accordance with the present invention, the data restructuring means for restructuring the coded data or decoded data that includes the video and audio information to the coded data to be acceptable for the digital signal processing equipment is provided.

The above-mentioned structure allows the video and audio information to be transmitted reproducibly to the digital signal processing equipment by way of the data restructuring means. In particular, in the case of the special reproduction of an image such as static reproduction, fast forward reproduction, or fast backward reproduction by use of the data reproduction transmission apparatus, the coded data that is conformable to the predetermined information processing rule needed for the digital signal processing equipment is restructured to thereby realize the continuous image processing on the digital signal processing equipment as in the case of the analog signal processing equipment.

According to the data reproduction transmission method in accordance with the present invention, when the coded video and audio information is reproduced, the coded data or decoded data that includes the video and audio information is restructured to the coded data that is acceptable for the digital signal processing equipment.

According to the above-mentioned structure, in the case of the special reproduction of the image such as static reproduction, fast forward reproduction, or fast backward reproduction, the video and audio information is transmitted reproducibly to the digital signal processing equipment.

The present invention is very preferably applied to a video audio information reproduction transmission apparatus that reproduces the video and audio information coded according to a predetermined information processing rule and that transmits it to a digital signal processing equipment.

What is claimed is:

1. A data reproduction transmission apparatus comprising:
reproduction means for reproducing multiplexed video information coded according to a predetermined information processing rule to provide multiplexed coded data;
decoding means for decoding the multiplexed coded data to generate decoded data;

supplying means for supplying the multiplexed coded data or decoded data generated by decoding the multiplexed coded data and that includes at least the video information;

data restructuring means for restructuring the multiplexed coded data or the decoded data to restructured coded data that conforms to a predetermined transmission format, and including:
  image extraction means for extracting an intra picture from the multiplexed coded data, and
  image interpolation means for interpolating B picture or P picture between extracted intra pictures; and
output means for supplying the restructured coded data for digital transmission;
coding means for re-coding the data generated by decoding the multiplexed coded data so that the re-coded data is acceptable for a digital signal processing apparatus, and
multiplexing means for multiplexing the re-coded data with the multiplexed coded data.

2. A data reproduction transmission apparatus comprising:
reproduction means for reproducing multiplexed video information coded according to a predetermined information processing rule to provide multiplexed coded data;
decoding means for decoding the multiplexed coded data to generate decoded data;
supplying means for supplying the multiplexed coded data or decoded data generated by decoding the multiplexed coded data and that includes at least the video information;
data restructuring means for restructuring the multiplexed coded data or the decoded data to restructured coded data that conforms to a predetermined transmission format, and including:
  image extraction means for extracting an intra picture from the multiplexed coded data, and
  image interpolation means for interpolating B picture or P picture between extracted intra pictures; and
output means for supplying the restructured coded data for digital transmission;
coding means for re-coding the decoded data generated by decoding the multiplexed coded data to re-coded data that is acceptable for a digital signal processing apparatus;
delay means for delaying the multiplexed coded data; and
selection means controlled to select the output of the delay means during normal reproduction and to select the output of the coding means during special reproduction.

3. The data reproduction transmission apparatus as claimed in claim 2, further including multiplexing means for multiplexing the output selected by said selection means with the multiplexed coded data.

4. A data reproduction transmission apparatus comprising:
reproduction means for reproducing multiplexed video information coded according to a predetermined information processing rule to provide multiplexed coded data;
decoding means for decoding the multiplexed coded data to generate decoded data;
supplying means for supplying the multiplexed coded data or decoded data generated by decoding the multiplexed coded data and that includes at least the video information;
data restructuring means for restructuring the multiplexed coded data or the decoded data to restructured coded data that conforms to a predetermined transmission format, and including:
  image extraction means for extracting an intra picture from the multiplexed coded data, and
  image interpolation means for interpolating B picture or P picture between extracted intra pictures; and
output means for supplying the restructured coded data for digital transmission;
coding means for re-coding the decoded data generated by decoding the multiplexed coded data to re-coded data that is acceptable for a digital signal processing equipment;
multiplexing means for multiplexing the re-coded data with the multiplexed coded data;
delay means for delaying the re-coded data that is not yet multiplexed; and
selection means controlled to select the output of the delay means during normal reproduction and to select the output of the multiplexing means during special reproduction.

5. A data reproduction transmission comprising:
reproduction means for reproducing multiplexed video information coded according to a predetermined information processing rule to provide multiplexed coded data;
decoding means for decoding the multiplexed coded data to generate decoded data;
supplying means for supplying the multiplexed coded data or decoded data generated by decoding the multiplexed coded data and that includes at least the video information;
data restructuring means for restructuring the multiplexed coded data or the decoded data to restructured coded data that conforms to a predetermined transmission format, and including:
  image extraction means for extracting an intra picture from the multiplexed coded data, and
  image interpolation means for interpolating B picture or P picture between extracted intra pictures; and
output means for supplying the restructured coded data for digital transmission;
data generation means for generating "0" stuffing bits that constitute coded data acceptable for a digital signal processing equipment; and
selection means controlled to select the multiplexed coded data during normal reproduction and to select "0" stuffing bits during special reproduction.

6. The data reproduction transmission apparatus as claimed in claim 5, further including multiplexing means for multiplexing the output from said selection means.

7. A data reproduction transmission apparatus comprising:
reproduction means for reproducing multiplexed video information coded according to a predetermined information processing rule to provide multiplexed coded data;
decoding means for decoding the multiplexed coded data to generate decoded data;
supplying means for supplying the multiplexed coded data or decoded data generated by decoding the multiplexed coded data and that includes at least the video information;

data restructuring means for restructuring the multiplexed coded data or the decoded data to restructured coded data that conforms to a predetermined transmission format, and including:
  image extraction means for extracting an intra picture from the multiplexed coded data, and
  image interpolation means for interpolating B picture or P picture between extracted intra pictures; and
output means for supplying the restructured coded data for digital transmission;

data generation means for generating dummy packet information or DIT information that constitutes coded data acceptable for a digital signal processing equipment; and
selection means controlled to select the multiplexed coded data during normal reproduction and to select the output of said data generation means during special reproduction.

* * * * *